(12) United States Patent
Yang et al.

(10) Patent No.: US 11,469,500 B2
(45) Date of Patent: Oct. 11, 2022

(54) LIQUID CRYSTAL ANTENNA, MANUFACTURING METHOD THEREOF AND COMMUNICATION DEVICE

(71) Applicant: Chengdu Tianma Micro-Electronics Co., Ltd., Sichuan (CN)

(72) Inventors: Zuocai Yang, Sichuan (CN); Qinyi Duan, Sichuan (CN); Ning He, Sichuan (CN); Donghua Wang, Sichuan (CN); Zhenyu Jia, Shanghai (CN); Kerui Xi, Shanghai (CN); Fei Chen, Sichuan (CN); Jing Wang, Shenzhen (CN); Liping Zhang, Shenzhen (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 85 days.

(21) Appl. No.: 17/125,684

(22) Filed: Dec. 17, 2020

(65) Prior Publication Data
US 2022/0094056 A1    Mar. 24, 2022

(30) Foreign Application Priority Data

Sep. 22, 2020   (CN) .......................... 202011004029.9

(51) Int. Cl.
    *G02F 1/13*     (2006.01)
    *H01Q 3/36*     (2006.01)
    *G02F 1/1343*   (2006.01)
    *G02F 1/1339*   (2006.01)

(52) U.S. Cl.
    CPC ............ *H01Q 3/36* (2013.01); *G02F 1/1313* (2013.01); *G02F 1/1339* (2013.01); *G02F 1/13439* (2013.01)

(58) Field of Classification Search
    CPC ..................................................... G02F 1/1313
    See application file for complete search history.

(56) References Cited

U.S. PATENT DOCUMENTS

2018/0205156 A1*   7/2018   Li ..................... H01Q 9/0457

FOREIGN PATENT DOCUMENTS

| CN | 106054442 A | 10/2016 |
|----|-------------|---------|
| CN | 109061930 A | 12/2018 |
| CN | 110649356 A | 1/2020  |

* cited by examiner

*Primary Examiner* — Edmond C Lau
(74) *Attorney, Agent, or Firm* — von Briesen & Roper, s.c.

(57) ABSTRACT

Provided are a liquid crystal antenna, a manufacturing method thereof and a communication device having the liquid crystal antenna. The liquid crystal antenna includes a first metal electrode, a second metal electrode, a third metal electrode, at least two oppositely arranged substrates, and a liquid crystal layer located between the two oppositely arranged substrates. The two oppositely arranged substrates each include a light transmission area. The first metal electrode, the second metal electrode and the third metal electrode within the light transmission area each are a hollowed-out structure, and the light transmission area can be used to test a cell thickness of the liquid crystal cell. Since the cell thickness can be measured, other process parameters can be matched and adjusted, so that a mass production yield of the liquid crystal antennas is improved.

20 Claims, 23 Drawing Sheets

Provide the first substrate and the second substrate, and form the first metal electrode, the line connected to the driving circuit and the first light transmission area on the first substrate, where the first metal electrode includes a plurality of microstrip line units ⟶ S11

Form the second metal electrode on one side of the second substrate and a second light transmission area within an area of the second substrate beyond the first frame sealing structure, where the second metal electrode includes a plurality of first hollowed-out areas ⟶ S12

Form the third metal electrode on another side of the second substrate, where the vertical projection of the first hollowed-out area on the second substrate is located within the vertical projection of the third metal electrode on the second substrate, and the third metal electrode is not overlapped with the second light transmission area ⟶ S13

Align the first substrate formed with the first metal electrode, the line connected to the driving circuit with the first light transmission area and the second substrate formed with the second metal electrode, the second light transmission area and the third metal electrode into a cell to form the liquid crystal cell, so that the first frame sealing structure and the liquid crystal layer are arranged between the first substrate and the second substrate, where the first frame sealing structure is arranged around the liquid crystal layer, and the first light transmission area is overlapped with the second light transmission area ⟶ S14

Cut the second substrate, so that the first substrate exposes the line connected to the driving circuit ⟶ S15

FIG. 31

Provide the first substrate, the second substrate and the third substrate, and form the first metal electrode, the line connected to the driving circuit and the first light transmission area on the first substrate, where the first metal electrode includes a plurality of microstrip line units — S21

Form the second metal electrode on one side of the second substrate and a second light transmission area within an area of the second substrate beyond the first frame sealing structure, where the second metal electrode includes a plurality of first hollowed-out areas — S22

Form the third metal electrode on one side of the third substrate — S23

Align the first substrate formed with the first metal electrode, the line connected to the driving circuit and the first light transmission area and the second substrate formed with the second metal electrode and the second light transmission area into a cell to form the liquid crystal cell, so that the first frame sealing structure and the liquid crystal layer are arranged between the first substrate and the second substrate, where the first frame sealing structure is arranged around the liquid crystal layer, and the first light transmission area is overlapped with the second light transmission area — S24

Cut the second substrate, so that the first substrate exposes the line connected to the driving circuit — S25

Align and fit the third substrate formed with the third metal electrode with the liquid crystal cell, so that an area of the third substrate overlapped with the first light transmission area and the second light transmission area on the third substrate is light transmissive — S26

FIG. 37

LIQUID CRYSTAL ANTENNA, MANUFACTURING METHOD THEREOF AND COMMUNICATION DEVICE

This application claims priority to Chinese Patent Application No. 202011004029.9 filed Sep. 22, 2020, the disclosure of which is incorporated herein by reference in its entirety.

TECHNICAL FIELD

The present application relates to the technology of communication, in particular, a liquid crystal antenna, a manufacturing method thereof and a communication device using the liquid crystal antenna.

BACKGROUND

An antenna plays an important role in transmitting and receiving electromagnetic waves as a radio device. In another word, if there were no antenna, there would be no radio device. At present, there are many kinds of antennas in the market, such as communication wires, television antennas, and radar antennas. With continuous development of communication technology, there is an increasing demand for communication with large capacity and high transmission speed. Especially with the advent of the 5G era, the antenna must have directivity, so that signal energy can be concentrated in a specific direction. On one hand, interference to other antenna devices is reduced, and on the other hand, waste of signal energy is reduced, thereby improving communication quality.

A liquid crystal antenna is a kind of antenna using the dielectric anisotropy of the liquid crystal to change magnitude of a phase shift of a phase shifter by controlling a deflection direction of the liquid crystal, so as to adjust an alignment direction of a phased array antenna. Compared with traditional antennas such as a horn antenna, spiral antenna and array antenna, the liquid crystal antenna has features such as miniaturization, wide-band, multi-band and high gain. Therefore, the liquid crystal antenna is a kind of antenna more suitable for current technological development, and has a wide application prospect in the fields such as satellite receiving antenna, vehicle radar, and base station antenna.

However, as a newly developed antenna product, the liquid crystal antenna has difficulty in producing a large quantity of products that meet performance requirements, and a corresponding yield is very low. In addition, liquid crystal antenna products produced in the same batch also have great differences in performance.

SUMMARY

In view of the above, embodiments of the present disclosure provide a novel liquid crystal antenna and a manufacturing method thereof to improve a production yield and performance stability of the liquid crystal antenna.

Firstly, provided is a liquid crystal antenna, including: a first substrate, a second substrate, a liquid crystal layer, a first metal electrode, a driving circuit, a second metal electrode, a third metal electrode, and a first frame sealing structure.

The second substrate is arranged opposite to the first substrate.

The liquid crystal layer is located between the first substrate and the second substrate.

The first metal electrode is located on one side of the first substrate facing toward the second substrate, and the first metal electrode includes a plurality of microstrip line units.

The driving circuit is located within a step area of the first substrate beyond the second substrate, and the first metal electrode is electrically connected to the driving circuit.

The second metal electrode is located on one side of the second substrate facing toward the first substrate, the second metal electrode includes a plurality of hollow-out areas, and a vertical projection of one of the plurality of hollow-out areas on the second substrate is located within a vertical projection (i.e., a second projection) of the first metal electrode on the second substrate.

The third metal electrode is located on one side of the second substrate facing away from the first substrate, the vertical projection of one of the plurality of first hollow-out areas on the second substrate is located within a vertical projection of the third metal electrode on the second substrate.

The first frame sealing structure is located between the first substrate and the second substrate and arranged around the liquid crystal layer, and the first substrate, the second substrate and the first frame sealing structure form a liquid crystal cell.

The first substrate and the second substrate each are a transparent substrate.

The first substrate includes a first extension area beyond the first frame sealing structure, the first extension area includes a first light transmission area, a first transparent film layer or no structure is arranged within the first light transmission area.

The second substrate includes a second extension area beyond the first frame sealing structure, the second extension area includes a second light transmission area, a second transparent film layer or no structure is arranged within the second light transmission area.

The first light transmission area is overlapped with the second light transmission area.

Secondly, provided is another liquid crystal antenna, including: a first substrate, a second substrate, a liquid crystal layer, a first frame sealing structure, a first metal electrode, a driving circuit, a second metal electrode, and a third metal electrode.

The second substrate is arranged opposite to the first substrate.

The liquid crystal layer is located between the first substrate and the second substrate.

The first frame sealing structure is located between the first substrate and the second substrate and arranged around the liquid crystal layer, and the first substrate, the second substrate and the first frame sealing structure form a liquid crystal cell.

The first metal electrode is located on one side of the first substrate facing toward the second substrate, and the first metal electrode includes a plurality of microstrip line units.

The driving circuit is located within a step area of the first substrate beyond the second substrate, and the first metal electrode is electrically connected to the driving circuit.

The second metal electrode is located on one side of the second substrate facing toward the first substrate, the second metal electrode includes a plurality of first hollow-out areas and at least one third hollow-out area, and a vertical projection of one of the plurality of first hollow-out areas on the second substrate is located within a vertical projection of the second metal electrode on the second substrate.

The third metal electrode is located on one side of the second substrate facing away from the first substrate, the vertical projection of the one of the plurality of first hollow-out areas on the second substrate is located within a vertical projection of the third metal electrode on the second substrate.

The at least one third hollow-out area is not overlapped with neither the first metal electrode nor the third metal electrode.

The vertical projection of the one of the plurality of first hollow-out areas and a vertical projection of the at least one third hollow-out area on the second substrate are located within a vertical projection of the liquid crystal cell on the second substrate.

Thirdly, further provided is a manufacturing method for the liquid crystal antenna, including the following steps.

A first substrate and a second substrate are provided, and a first metal electrode, a line connected to a driving circuit and a first light transmission area are formed on the first substrate, where the first metal electrode includes a plurality of microstrip line units.

A second metal electrode is formed on one side of the second substrate and a second light transmission area is formed within an area of the second substrate beyond the first frame sealing structure, where the second metal electrode includes a plurality of first hollow-out areas.

A third metal electrode is formed on another side of the second substrate, where a vertical projection of one of the plurality of first hollow-out areas on the second substrate is located within a vertical projection of the third metal electrode on the second substrate, and the third metal electrode is not overlapped with the second light transmission area.

The first substrate formed with the first metal electrode, the line connected to the driving circuit and the first light transmission area and the second substrate formed with the second metal electrode, the second light transmission area and the third metal electrode are aligned into a cell to form a liquid crystal cell, so that a first frame sealing structure and a liquid crystal layer are arranged between the first substrate and the second substrate, where the first frame sealing structure is arranged around the liquid crystal layer, and the first light transmission area is overlapped with the second light transmission area.

The second substrate is cut, so that the first substrate exposes the line connected to the driving circuit.

Fourthly, further provided is another manufacturing method for a liquid crystal antenna, including the following steps.

A first substrate, a second substrate and a third substrate are provided, and a first metal electrode, a line connected to a driving circuit and a first light transmission area are formed on the first substrate, where the first metal electrode includes a plurality of microstrip line units.

A second metal electrode is formed on one side of the second substrate and a second light transmission area is formed within an area of the second substrate beyond the first frame sealing structure, where the second metal electrode includes a plurality of first hollow-out areas.

A third metal electrode is formed on one side of the third substrate.

The first substrate formed with the first metal electrode, the line connected to the driving circuit and the first light transmission area and the second substrate formed with the second metal electrode and the second light transmission area are aligned into a cell to form a liquid crystal cell, so that a first frame sealing structure and a liquid crystal layer are arranged between the first substrate and the second substrate, where the first frame sealing structure is arranged around the liquid crystal layer, and the first light transmission area is overlapped with the second light transmission area.

The second substrate is cut, so that the first substrate exposes the line connected to the driving circuit.

The third substrate formed with the third metal electrode is aligned and fitted with the liquid crystal cell, so that an area of the third substrate overlapped with the first light transmission area and the second light transmission area is light transmissive.

Finally, further provided is still another manufacturing method for a liquid crystal antenna, including the following steps.

A first substrate and a second substrate are provided, and a first metal electrode, and a line connected to a driving circuit are formed on the first substrate, where the first metal electrode comprises a plurality of microstrip line units.

A second metal electrode is formed on one side of the second substrate, where the second metal electrode includes a plurality of first hollow-out areas and at least one third hollow-out area.

A third metal electrode is formed on another side of the second substrate, where a vertical projection of one of the plurality of first hollow-out areas on the second substrate is located within a vertical projection of the third metal electrode on the second substrate, and the third metal electrode is not overlapped with the third light transmission area.

The first substrate formed with the first metal electrode and the line connected to the driving circuit and the second substrate formed with the second metal electrode and the third metal electrode are aligned into a cell to form a liquid crystal cell, so that a first frame sealing structure and a liquid crystal layer are arranged between the first substrate and the second substrate, where the first frame sealing structure is arranged around the liquid crystal layer, and the at least one third hollow-out area is not overlapped with the first metal electrode.

The second substrate is cut, so that the first substrate exposes the line connected to the driving circuit.

Compared with the liquid crystal antenna in the related art, the liquid crystal antenna and the manufacturing method thereof provided in embodiments of the present disclosure has the following beneficial effects.

More qualified liquid crystal antennas can be selected by changing the structure of the liquid crystal antenna in the related art, or corresponding matching signals, etc. can be adjusted according to cell thickness parameters. On one hand, one substrate is separately extended, so that the one substrate outside a functional area of the antenna is arranged opposite to an area of the other substrate where no metal layer is provided, and the cell thickness can be measured through the structure. On the other hand, the oppositely arranged substrate is capable of realizing cell thickness measurement at a hollow-out areaed-out place by reasonably hollow-out areaing out part of the metal layer.

BRIEF DESCRIPTION OF DRAWINGS

To illustrate the solutions in the embodiments of the present disclosure or the solutions in the related art more clearly, drawings used in the description of the embodiments or the related art will be briefly described below. Apparently, the drawings described below are merely embodiments of the present disclosure, and those skilled in the art may obtain other drawings based on the provided drawings on the premise that no creative work is done.

FIG. 31 is a flow chart illustrating a manufacturing method for a liquid crystal antenna according to an embodiment of the present application;

FIG. 37 is a flow chart illustrating another manufacturing method for a liquid crystal antenna according to an embodiment of the present application;

DETAILED DESCRIPTION

The solutions in the embodiments of the present disclosure will be described clearly and completely in conjunction with the drawings in the embodiments of the present disclosure. Apparently, the embodiments described are part, not all, of the embodiments of the present disclosure. Based on the embodiments of the present disclosure, all other embodiments obtained by those skilled in the art without creative work are within the scope of the present disclosure.

Embodiments in this Description are described in a progressive manner. Each embodiment focuses on differences from other embodiments. The same or similar parts in each embodiment can be referred to by each other. As for the device disclosed in the embodiment, since corresponding to the method disclosed in the embodiment, description of the device is relatively simple, and the relevant part may refer to the description of the method.

Figure 1:
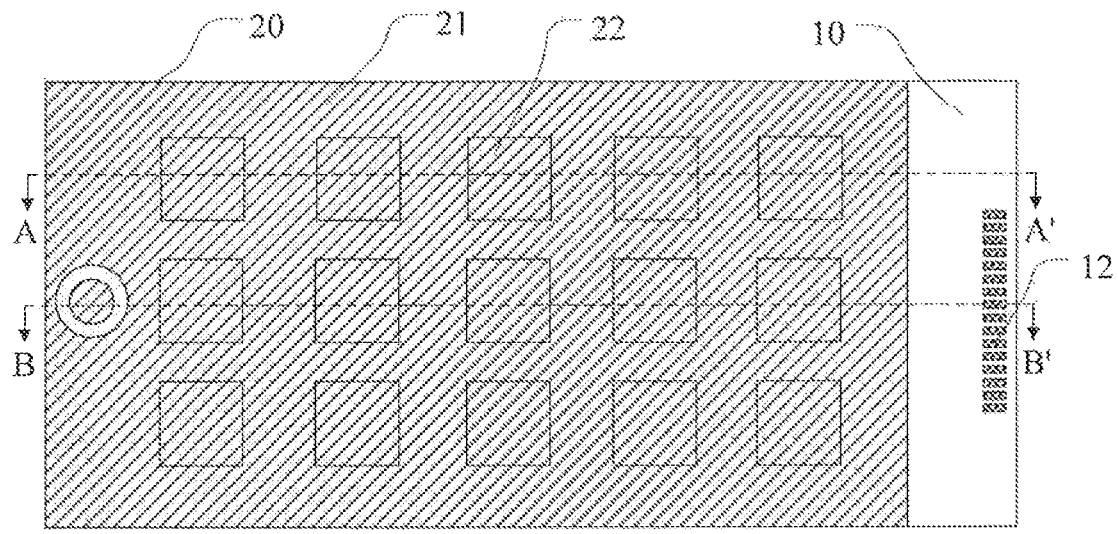
FIG. 1 is a structural diagram illustrating a liquid crystal antenna in the related art.
Figure 2:
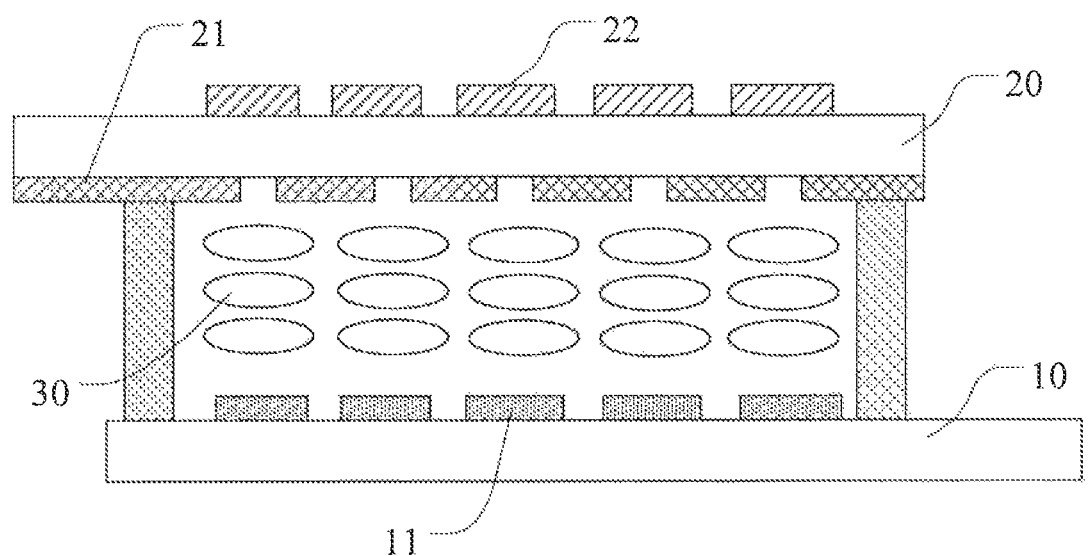
FIG. 2 is a sectional diagram taken along AA' of FIG. 1.
Figure 3:
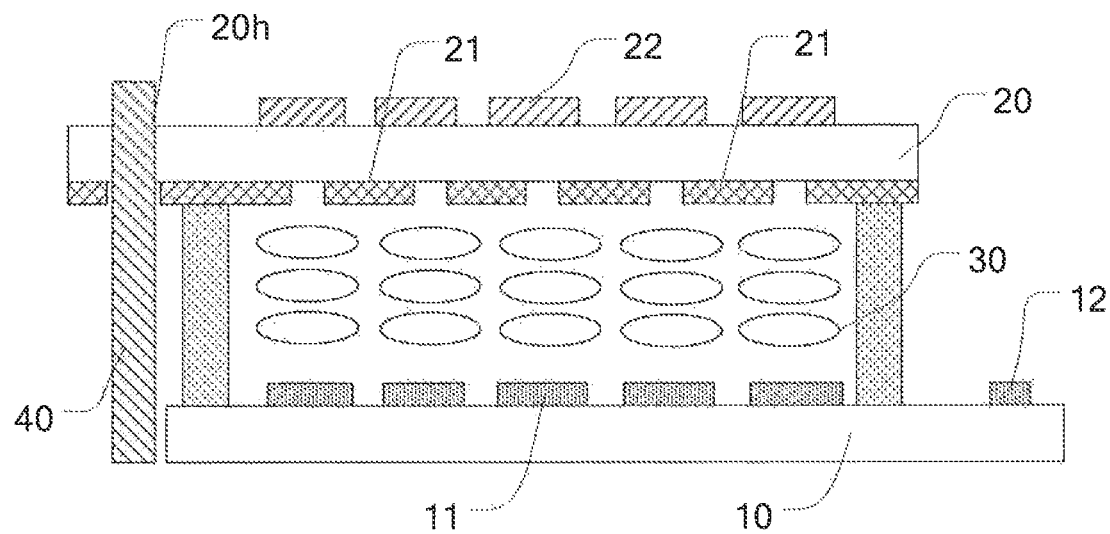
FIG. 3 is a sectional diagram taken along BB' of FIG. 1.

Please refer to FIGS. 1 to 3. FIG. 1 is a structural diagram illustrating a liquid crystal antenna in the related art. FIG. 2 is a sectional diagram taken along AA of FIG. 1. FIG. 3 is a sectional diagram taken along BB' of FIG. 1. One of liquid crystal antennas in the related art includes a first substrate 10, a second substrate 20 opposite to the first substrate 10, and a liquid crystal layer 30 located between the first substrate 10 and the second substrate 20. The first substrate 10 is provided with a microstrip line unit 11, and the second substrate 20 is provided with a ground electrode 21 and a radiator electrode 22. A high frequency signal is introduced into the liquid crystal antenna by drilling. Specifically, as shown in FIGS. 1 and 3, a through hole 20h running through the second substrate 20 is arranged on one side of the second substrate 20 beyond the first substrate 10, a metal rod 40 provides a high frequency signal to the liquid crystal antenna through the through hole 20h, and the high frequency signal transmits a signal outward under the control of the microstrip line unit 11, the ground electrode 21 and the radiator electrode 22.

However, it is difficult to achieve mass production of the liquid crystal antennas in the related art. Even for thousands of liquid crystal antenna products produced in a same batch, only a few of them can barely meet performance requirements at present, which is bound to lead to extremely low production yield and high production cost, making it impossible to commercialize the liquid crystal antennas, thereby hindering wide use of the liquid crystal antennas. Research and development personnels of the present application found that thickness of a liquid crystal cell of the liquid crystal antenna has a great influence on performance of the antenna.

However, even if the influence of the cell thickness is taken into account in design, and the cell thickness and the frequency of the high frequency signal, a shape and thickness of the microstrip line unit, and a position of the radiator electrode, etc. are best matched in a design stage, products produced are still difficult to meet the performance requirements.

Further, the research and development personnel of the present application further found that because control of the thickness of the liquid crystal cell needs to control an amount of liquid crystal dripping during alignment in forming the cell and pressure of pressure head after an initial cell is formed, the control of the amount of liquid crystal currently has an error range in a process, and an error range of the cell thickness caused by this error range of the amount of liquid crystal has already led to great differences in the performance of the liquid crystal antenna. For example, there has been an order of magnitude difference in an amount of signal radiation. On the other hand, there is also a certain error in a magnitude of the pressure of the pressure head, which eventually leads to great difficulties in mass production of the liquid crystal antennas that meet a performance standard, making it difficult to replace traditional antennas.

On this basis, after studying structures of the liquid crystal antennas in the related art, the research and development personnel of the present application found that, in the structure of the liquid crystal antenna, the radiator electrode 22 and the microstrip line unit 11 are arranged at a slit of the ground electrode 21. Therefore, there is no place where the cell thickness can be measured at a position of the liquid crystal cell. Therefore, in order to solve the above problems, the research and development personnels of the present application can carry out measurement of the cell thickness by setting a light transmission area in the liquid crystal cell; or a surrounding area of the liquid crystal cell is specially designed to simulate the liquid crystal cell, so that the cell thickness of the liquid crystal cell is determined by testing the cell thickness of the surrounding area. Hereinafter, the present application will be described through some specific embodiments.

Figure 4:
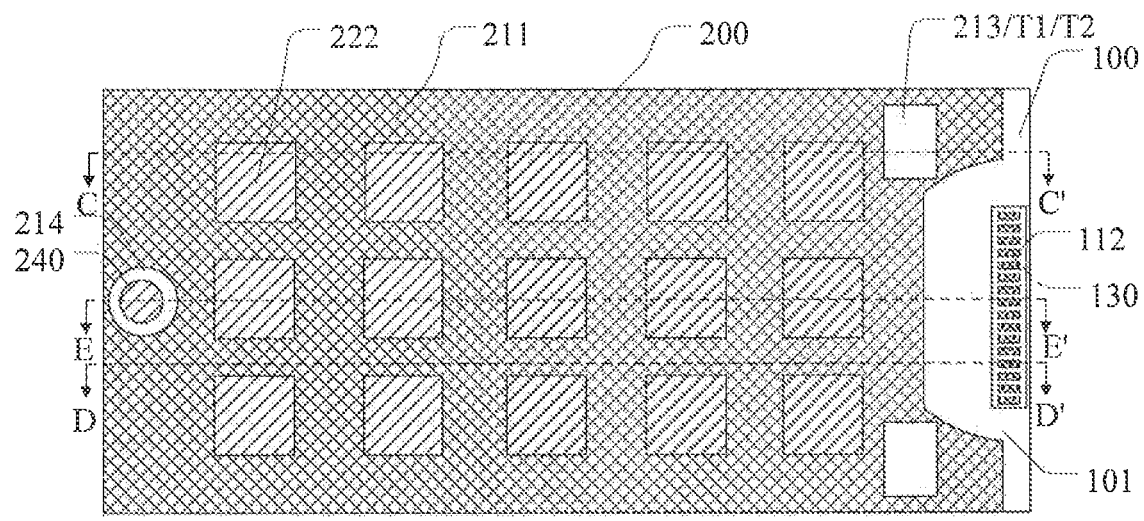
FIG. 4 is a structural diagram illustrating a liquid crystal antenna according to an embodiment of the present application.
Figure 5:
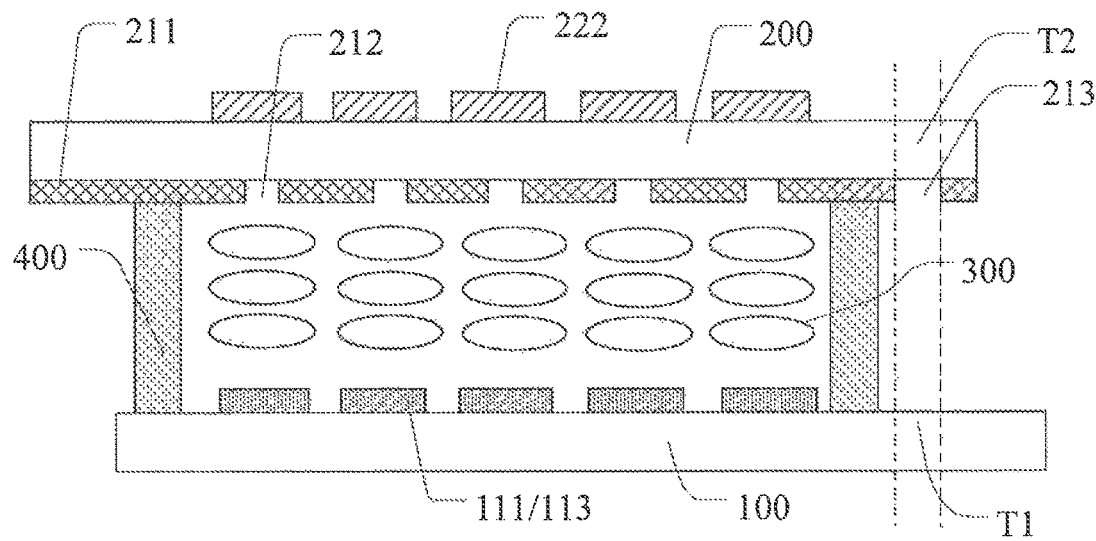
FIG. 5 is a sectional diagram taken along CC' of FIG. 4.

In an embodiment, provided is a novel liquid crystal antenna. Please refer to FIGS. 4 and 5, FIG. 4 is a structural diagram illustrating the liquid crystal antenna according to an embodiment of the present application. FIG. 5 is a sectional diagram taken along CC' of FIG. 4. The liquid crystal antenna includes a first substrate 100, a second substrate 200, a liquid crystal layer 300, a first metal electrode 111, a first frame sealing structure 400, a second metal electrode 211, a third metal electrode 222, and a driving circuit 130. The first substrate 100 is oppositely arranged to the second substrate 200. The liquid crystal layer 300 is located between the first substrate 100 and the second substrate 200. The first metal electrode 111 is located on one side of the first substrate 100 facing toward the second substrate 200, and the first metal electrode 111 includes a plurality of microstrip line units 113. The driving circuit 130 is located in a step area 101 of the first substrate 100 beyond the second substrate 200, and the first metal electrode 111 is electrically connected to the driving circuit 130. The second metal electrode 211 is located on one side of the second substrate 200 facing toward the first substrate 100, the second metal electrode 211 includes a plurality of first hollow-out areas 212, and a vertical projection of the plurality of first hollow-out areas 212 on the second substrate 200 is located within a vertical projection of the first metal electrode 111 on the second substrate 200. The third metal electrode 222 is located on one side of the second substrate 200 facing away from the first substrate 100, and the vertical projection of the one of the plurality of the first hollow-out areas 212 on the second substrate 200 is located within a vertical projection of the third metal electrode 222 on the second substrate 200. The first frame sealing structure 400 is located between the first substrate 100 and the second substrate 200 and arranged around the liquid crystal layer 300, and the first substrate 100, the second substrate 200 and the first frame sealing structure 400 form a liquid crystal cell. The first substrate 100 and the second substrate 200 are transparent substrates. The first substrate 100 includes a first extension area beyond the first frame sealing structure 400. The first extension area includes a first light transmission area T1, and the first light transmission area T1 is provided with no structure or the first light transmission area T1 is provided with a transparent film layer. For example, the first light transmission area T1 is provided with a transparent insulating film, including but not limited to silicon nitride, silicon oxide, organic insulating film, etc.

The second substrate 200 includes a second extension area beyond the first frame sealing structure 400, the second extension area includes a second light transmission area T2, and the second light transmission area T2 is provided with no structure or the second light transmission area T2 is provided with a transparent film layer. A vertical projection of the first light transmission area T1 is overlapped with a vertical projection of the second light transmission area 12. In an embodiment, the first hollow-out area 212 is covered by the third metal electrode 222 and is located within a range of the first metal electrode 111. The second light transmission area T2 is provided with no structure or the second light transmission area T2 is provided with a transparent film layer. For example, the second light transmission area T2 is provided with is provided with the transparent insulating film, including but not limited to silicon nitride, silicon oxide, organic insulating film, etc.

Please continue to refer to FIGS. 4 and 5, in an embodiment, the first substrate 100 and the second substrate 200 may be a glass substrate or a polymer substrate, for example, a plastic substrate. Specific materials of the first substrate 100 and the second substrate 200 are not limited herein, as long as the first substrate 100 and the second substrate 200 are transparent substrates. Apparently, taking production cost, manufacturing process and transmittance requirements into account, the first substrate 100 and the second substrate 200 are preferably glass substrates.

In the embodiment of the present application, due to overlap of the vertical projection of the first transmission area T1 and the vertical projection of the second transmission area T2, light can pass through a sandwiched area 213 formed between the first transmission area T1 and the second transmission area T2, and the sandwiched area 213 can perform measurement of the cell thickness by an optical measurement method. Although the sandwiched area 213 formed between the first light transmission area T1 and the second light transmission area T2 is not a liquid crystal cell area, since the first light transmission area T1 is located within the first substrate 100 and the second transmission area 12 is located within the second substrate 200, a cell thickness of the liquid crystal cell is supposed to be H1, a distance between the first substrate 100 and the second substrate 200 is supposed to be H2, a thickness sum of film layers formed on a surface of the first substrate 100 and located on one side of the first substrate 100 facing toward the second substrate 200 is supposed to be H3, and a thickness sum of film layers formed on a surface of the second substrate 200 and located on one side of the second substrate facing toward the first substrate 100 is supposed to be H4, then H1=H2−(H3+H4). Therefore, when opposite surfaces of the first substrate 100 and the second substrate 200 that are arranged at corresponding positions of the first light transmission area T1 and the second light transmission area T2 are not provided with the film layers, a thickness L of the sandwiched area 213 formed between the first light transmission area T1 and the second light transmission area T2 is equal to the distance 112 between the first substrate 100 and the second substrate 200, and the thickness sum H3 of the film layers formed on the surface of the first substrate 100 can be measured or calculated during cell forming. Similarly, the thickness sum of the film layers formed on the surface of the second substrate 200 can be measured or calculated between forming cells, so that H1 can be determined merely by determining H2.

If the cell thickness of the liquid crystal cell of the liquid crystal antenna can be measured by the optical measurement method, the cell thickness can be measured after the first substrate 100 and the second substrate 200 are initially fitted in a process of production. If a measured cell thickness is within a preset range, pressure of a pressure head can be adjusted to ensure that a final cell thickness of a final produced liquid crystal antenna can meet the requirements. In addition, if the final produced liquid crystal antenna fails to meet the requirements in terms of performance, it can also be confirmed by the optical measurement method whether this is caused by a case where the cell thickness of the liquid crystal cell is not within a reasonable range, thereby further improving the production yield of the liquid crystal antenna.

Figure 6:
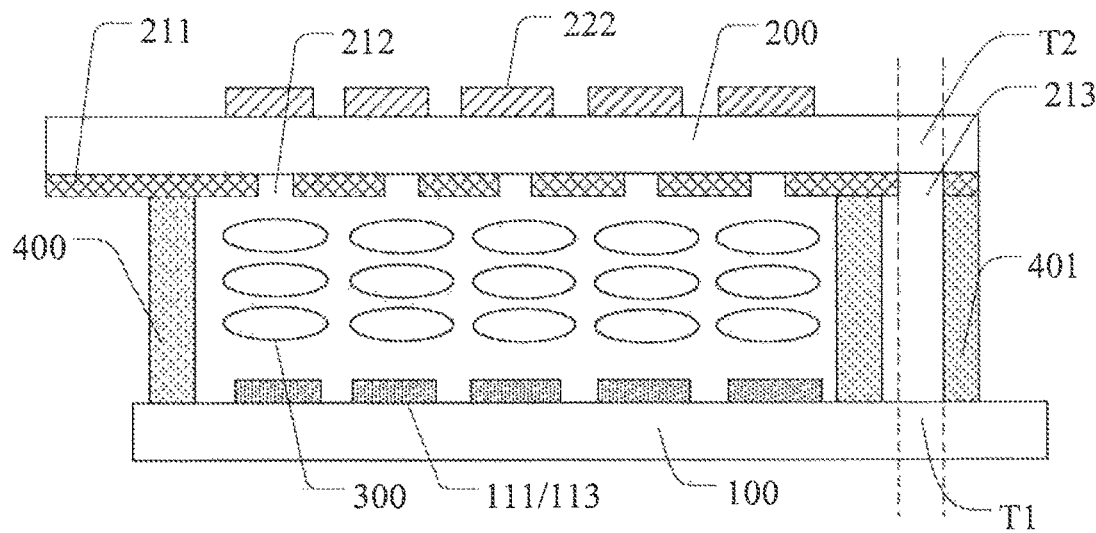
FIG. 6 is another sectional diagram taken along CC' of FIG. 4.

In an embodiment, the liquid crystal antenna further includes a second frame sealing structure. In an exemplary embodiment, please refer to FIGS. 4 and 6, the liquid crystal antenna further includes a second frame sealing structure 401. The second frame sealing structure 401 is located on one side of the first frame sealing structure 400, and the first substrate 100, the second substrate 200, the second frame sealing structure 401 and the first frame sealing structure 400 form an extension cell. In another exemplary embodiment, the second frame sealing structure 401 is located on one side of the first frame sealing structure 400, and the second frame sealing structure 401 and the first frame sealing structure 400 together form a closed shape. By setting the extension cell, areas of the first substrate 100 and the second substrate 200 beyond the liquid crystal cell are also supported by the second frame sealing structure 401, thereby further ensuring that a distance between the first substrate 100 and the second substrate 200 and at the sandwiched area formed between the first light transmission area T1 and the second light transmission area T2 does not change compared with the liquid crystal cell area, thereby improving accuracy of the measurement of the cell thickness of the liquid crystal cell.

In an embodiment, the first frame sealing structure 400 and the second frame sealing structure 401 each are frame sealant. The frame sealant is viscous, has strong plasticity under a normal condition, and has mechanical properties when cured by light or other means. Therefore, liquid crystal leakage can be prevented by the frame sealant arranged between the first substrate 100 and the second substrate 200, and meantime, the cell thickness is maintained. When the first frame sealing structure 400 and the second frame sealing structure 401 are made of a same material, for example, both are made of the frame sealant, the pressure of the pressure head can be adjusted based on the same relevance to avoid increasing the production cost. In an exemplary embodiment, different materials change differently under a same pressure. In order to obtain a target cell thickness, it is necessary to master a relationship between the pressure and the volume change of an object under pressure.

In an embodiment, the first frame sealing structure 400 is the frame sealant and the second frame sealing structure 401 is a supporting retaining wall. In an exemplary embodiment, please refer to FIGS. 7 and 8, a supporting column 230 is arranged in the liquid crystal cell of the liquid crystal antenna, and the supporting column 230 is formed on one side of the second substrate 200 facing toward the first substrate 100. In another embodiment, the supporting column 230 is formed by a film forming and lithography process. When the second frame sealing structure 401 is the supporting retaining wall, the second sealing frame 401 and the supporting column 230 can be made of a same material and manufactured through a same process, thereby avoiding additional manufacturing steps.

Figure 7:
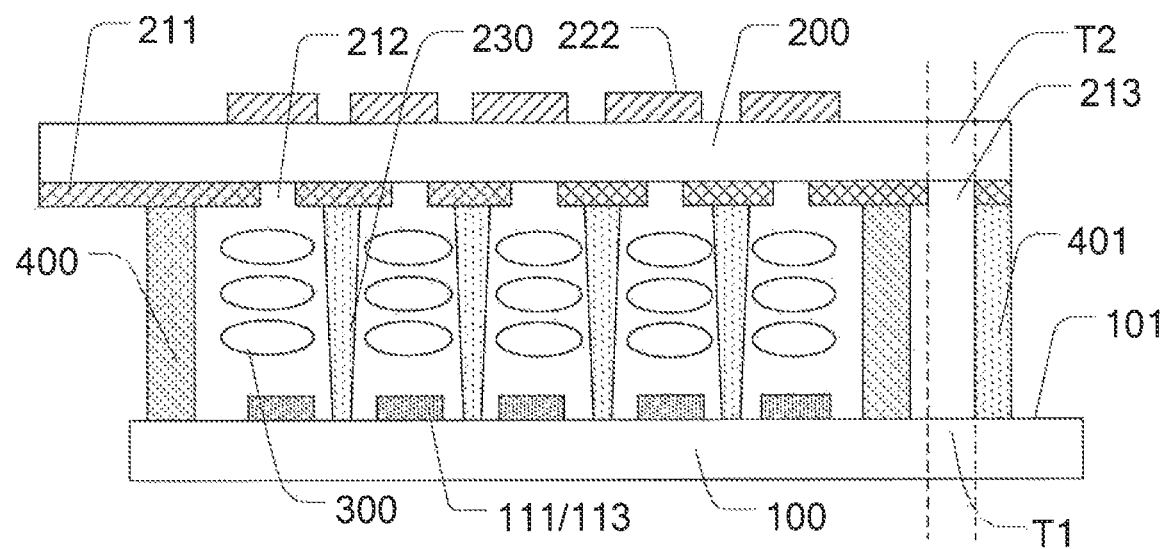
FIG. 7 is still another sectional diagram taken along CC' of FIG. 4.
Figure 8:
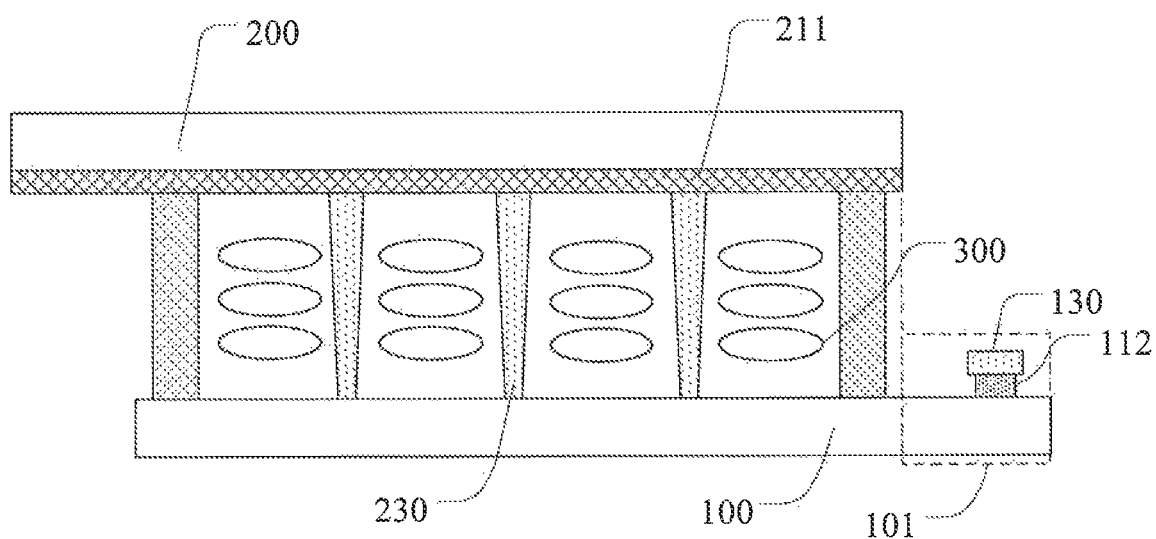
FIG. 8 is a sectional diagram taken along DD' of FIG. 4.

Combined with structures illustrated in FIGS. 4, 7 and 8, the supporting columns 230 may be arranged within gaps between the plurality of microstrip line units 113. In practice, density of the supporting columns 230 can be set as needed, thereby increasing a support force between the first substrate 100 and the second substrate 200 and ensuring the cell thickness of the liquid crystal cell.

In an embodiment, referring to FIG. 4, the first light transmission area T1 and the step area 101 are located on a same side of the liquid crystal cell. The step area 101 is an area of the first substrate 100 beyond the second substrate 200. The step area 101 is provided with the driving circuit 130. The driving circuit 130 is electrically connected to a binding pad 112 located on the step area 101. The binding pad 112 is connected to the microstrip line units 113 by a wire (not shown in FIG. 4). Therefore, besides the area where the wire connecting the binding pad 112 with the microstrip line unit 113 is arranged, the step area 101 is also provided with an area where no wire is arranged, and the area where no wire is arranged can be used as the first light transmission area T1 to avoid widening a frame of the liquid crystal antenna, thereby capable of maintaining an advantage of the liquid crystal antennas that are smaller than traditional ones. Moreover, a vertical projection of the second substrate 200 on the first substrate 100 is extended to partially overlap with the step area 101, so that the vertical projection of the second light transmission area T2 and the vertical projection of the first light transmission area T1 can overlap to form a light transmission area 213. It is worth noting that even the second substrate 200 is extended to overlap with the step area 101 of the first substrate 100, the area of the step area 101 of the first substrate 100 where a vertical projection of the binding pad 112 on the first substrate 100 is arranged cannot overlap with the vertical projection of the second substrate 200 on the first substrate 100, so as to be bound with the driving circuit 130.

Please continue to refer to FIG. 4, in an embodiment, the liquid crystal antenna further includes a signal introduction area of the second substrate 200 beyond the first substrate 100. The second metal electrode 211 further includes a second hollow-out area 214, and the signal introduction area is located within the second hollow-out area 214. A through hole running through the second substrate 200 is arranged within the signal introduction area, and a signal introduction rod 240 passes through the through hole to transmit a high frequency signal to the liquid crystal antenna. The liquid crystal antenna is introduced with the signal through the signal introduction rod 240 and radiates the signal outward.

Figure 9:
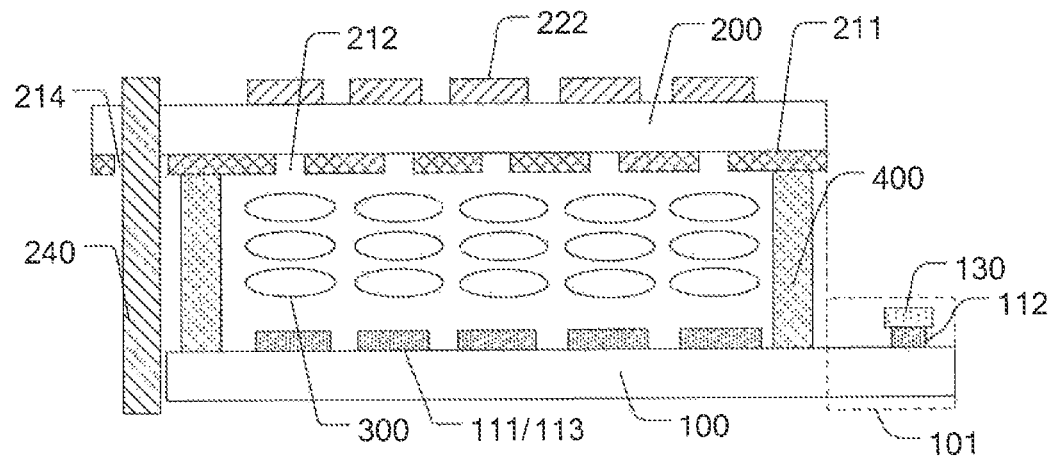
FIG. 9 is a sectional diagram taken along EE' of FIG. 4.

In an embodiment, the signal introduction area and the step area 101 are respectively located on both sides of the liquid crystal cell and are oppositely arranged. Referring to FIG. 9, the signal introduction area is located on a left side of the liquid crystal cell, and the step area 101 is located on a right side of the liquid crystal cell. The signal introduction area and the step area 101 are respectively arranged on two opposite sides of the liquid crystal cell, so that the signal introduction area of the second substrate 200 can be perforated, and the driving circuit can be bound to the first substrate 100.

Figure 10:
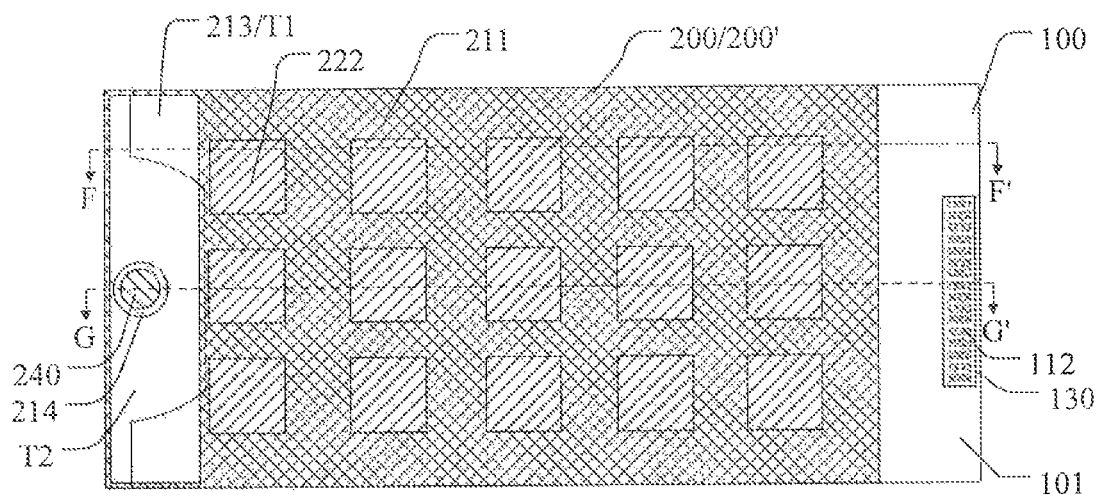
FIG. 10 is a structural diagram illustrating another liquid crystal antenna according to an embodiment of the present application.
Figure 11:
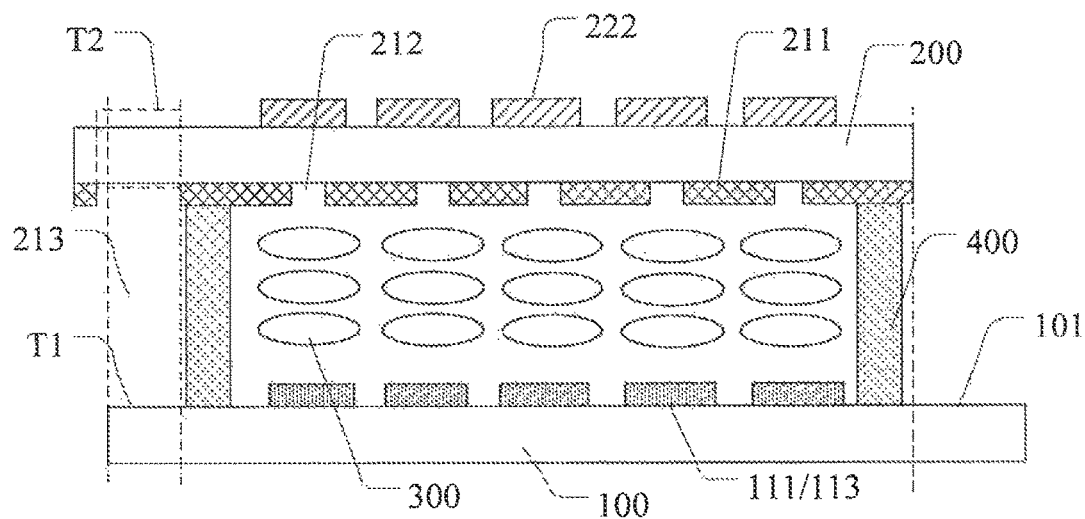
FIG. 11 is a sectional diagram taken along FF' of FIG. 10.
Figure 12:
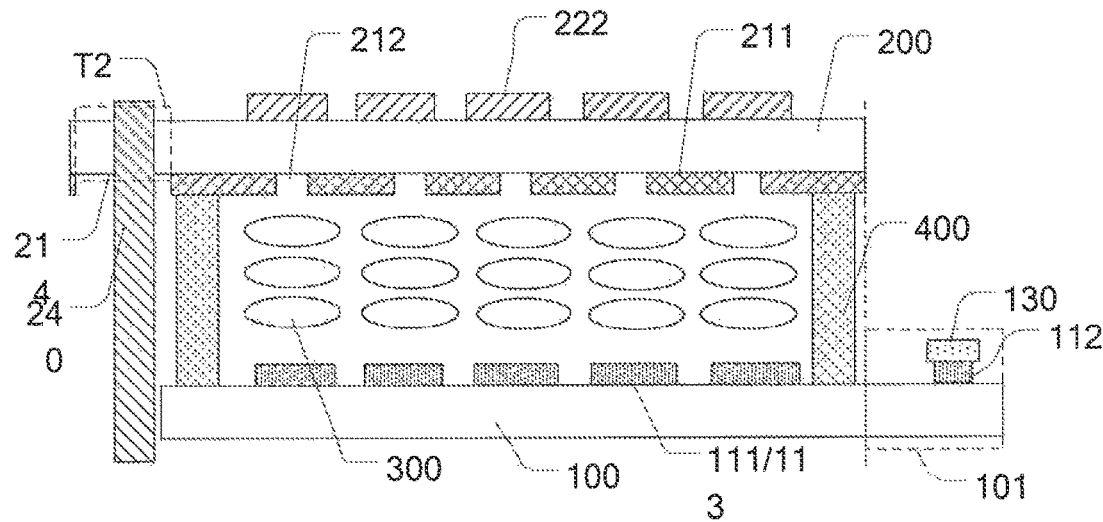
FIG. 12 is a sectional diagram taken along GG' of FIG. 10.

In the above embodiments provided in the present application, the second substrate 200 is extended to overlap with the step area 101 of the first substrate 100. However, embodiments provided in the present application are not limited to this. In an embodiment, please refer to FIGS. 10 to 12, the second light transmission area T2 and the signal introduction area are located on a same side of the liquid crystal cell. The signal introduction area is provided with the signal introduction rod 240. That is, the second light transmission area T2 and the signal introduction rod 240 are located on a same side of the liquid crystal cell. In the related art, the signal introduction rod is arranged on one side of the second substrate 200 beyond the first substrate 100 by perforating, and the ground electrode is hollow-out areaed out in an area where the signal introduction rod is located. However, in the embodiments provided in the present application, compared with the liquid crystal antennas in the related art, the second metal electrode 211 is provided with a larger hollow-out area in an area of the second substrate 200 beyond the liquid crystal cell. Referring to FIG. 10, in the embodiment provided by the present application, the area of the second substrate 200 beyond the liquid crystal cell is provided with a hollow-out area, that is, the second light transmission area T2. The second hollow-out area 214 in the second light transmission area T2 as shown in FIG. 10 corresponds to the signal introduction area of the liquid crystal antenna in the related art. Therefore, in the above-mentioned method provided by the embodiment of the present application, the second hollow-out area 214 and the second light transmission area T2 are formed in a same production process without increasing the production cost. In addition, since the second light transmission area T2 is much larger than the second hollow-out area 214, it is easier to align to a position of a feeder line when perforating, thereby improving the production yield of the liquid crystal antenna.

In the above-mentioned embodiment, the first substrate 100 is extended to overlap with one side of the second substrate 200 where the signal introduction rod 240 is arranged, and a transparent area is arranged in such overlap area to realize the measurement of the cell thickness. As shown in FIG. 10, the first light transmission area T1 extending out from the first substrate 100 is not overlapped with the vertical projection of the signal introduction area on the first substrate 100. In an exemplary embodiment, supposing that a connection line between the signal introduction area and the step area 101 is parallel to a first direction, the first direction is parallel to a first side of the liquid crystal antenna, and in a direction perpendicular to the first side, the first light transmission area T1 extending out from the first substrate 100 is located on both sides of the signal introduction area, so as to perforate in the signal introduction area to allow the signal introduction rod to pass through.

Figure 13:
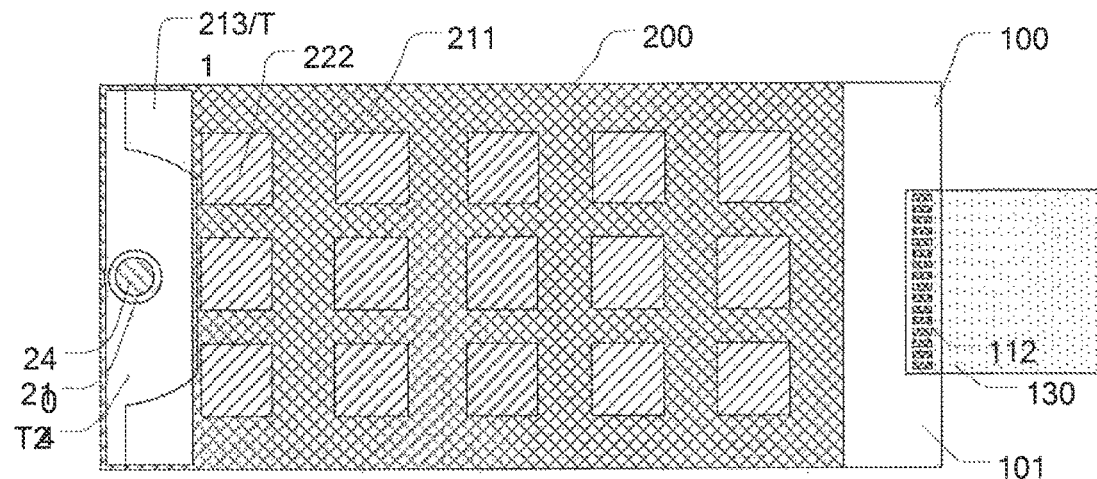
FIG. 13 is a structural diagram illustrating still another liquid crystal antenna according to an embodiment of the present application.

As illustrated in FIG. 13, in the liquid crystal antenna provided by an embodiment of the present application, the driving circuit 130 is a flexible circuit board. Because of its flexibility, the flexible circuit board can be connected to other driving members by bending or other ways. Apparently, the embodiments of the present application are not limited to this. In an embodiment, the driving circuit 130 may be a driving chip. The driving chip is capable of communicating with other electronic devices through the flexible circuit board. Apparently, the flexible circuit board illustrated in FIG. 13 is directly connected to the binding pad 112 on the first substrate 100, or the driving chip can be first bound to the flexible circuit board, and then the flexible circuit board is connected to the binding pad 112.

Figure 14:
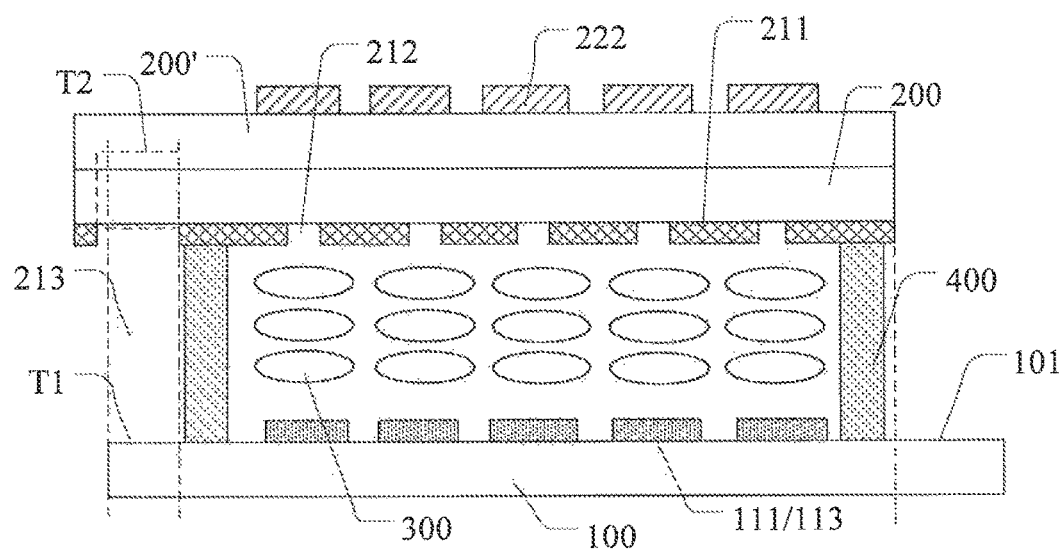
FIG. 14 is another sectional diagram taken along FF' of FIG. 10.

In the above-mentioned embodiment of the present application, the second metal electrode 211 and the third metal electrode 222 are respectively arranged on both sides of a same substrate. In other embodiments of the present application, the second metal electrode 211 and the third metal electrode 222 can also be arranged on different substrates. In an exemplary embodiment, please refer to FIG. 14, the liquid crystal antenna further includes a third substrate 200'. The third substrate 200' is located on one side of the second substrate 200 facing away from the first substrate 100. The third metal electrode 222 is located on one side of the third substrate 200' facing away from the second substrate 200. An area of the third substrate 200' overlapping with vertical projections of the first light transmission area T1 and second light transmission area T2 on the third substrate 200' is light transmissive. In the present embodiment, since the second metal electrode 211 is arranged on the second substrate 200 and the third metal electrode 222 is arranged on the third substrate 200', double-sided fabrication of a patterned conductive structure on a same substrate is avoided, thereby reducing process difficulty.

In the related art, although a method of fabricating patterned conductive structures on both sides of a same substrate is theoretically feasible, complex processing steps are often needed in practice. For example, after fabricating one conductive structure on a first side, if another conductive structure on a second side needs to be fabricated, the one conductive structure that has been fabricated on the first side needs to be protected in advance, otherwise the one conductive structure fabricated on the first side will be broken when the other conductive structure is fabricated on the second side.

Figure 15:
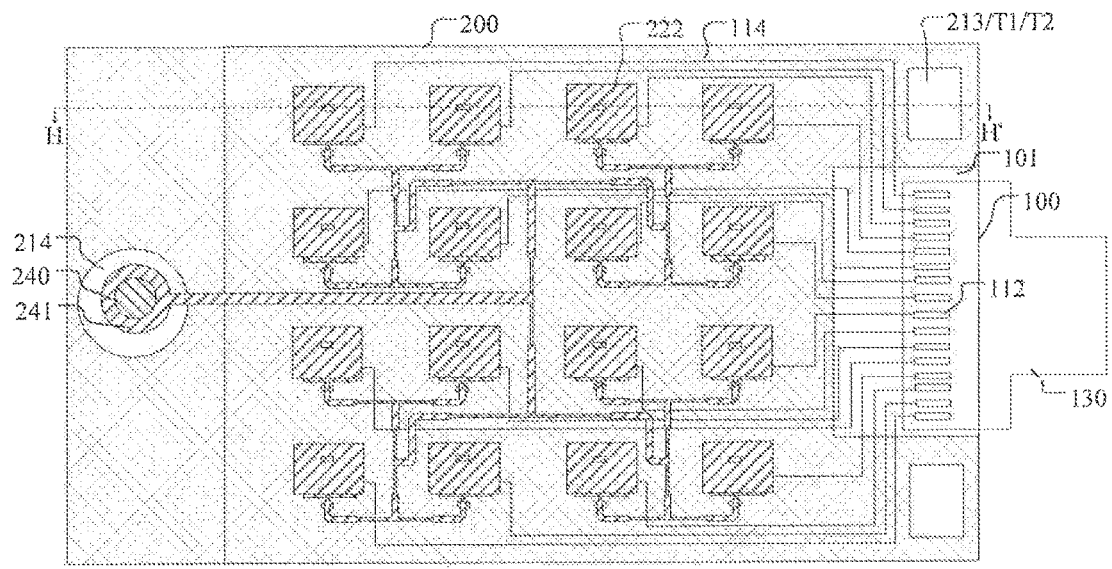
FIG. 15 is a structural diagram illustrating still another liquid crystal antenna according to an embodiment of the present application.
Figure 16:
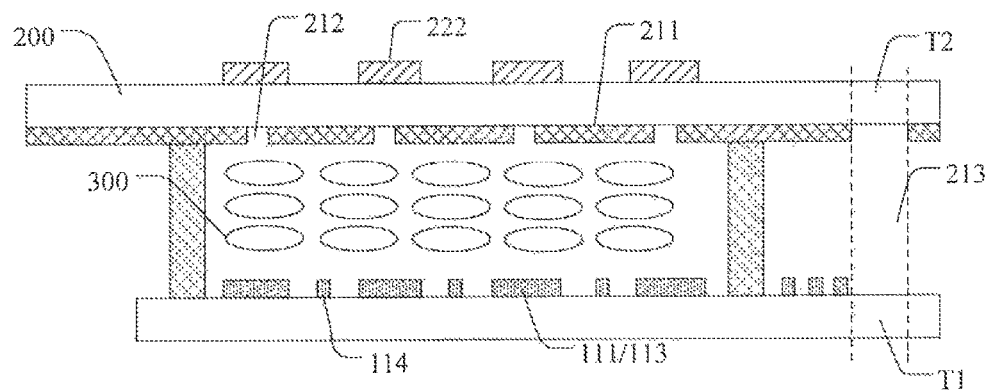
FIG. 16 is another sectional diagram taken along GG' of FIG. 15.

Illustrated in FIGS. 4 to 14, part of the liquid crystal antenna is omitted. In order to further clearly describe the liquid crystal antenna provided by the embodiment of the present application, please further refer to FIGS. 15 and 16. In an embodiment, one of the wires 114 for connecting one of the binding pads 112 with one of the microstrip line units 113 is further arranged on the first substrate 100. The wires 114 connected to the respective microstrip line units 113 are insulated from each other and connected to the different binding pads 112. The second substrate 200 is provided with a feeder line 241 electrically connected to the signal introduction rod 240. The feeder line 241 is distributed in a dendritic shape and includes a plurality of branches, and a vertical projection of one branch of the feeder line 241 on the second substrate 200 partially overlaps with a vertical projection of one microstrip line unit 113 on the second substrate 200. The feeder line 241 couples the high frequency signal of the signal introduction rod 240 to the microstrip line unit 113, and the signal transmitted in the microstrip line unit 113 is controlled by controlling deflection of the liquid crystal layer 300. Finally, the signal is coupled to the third metal electrode 222 at the first hollow-out area 212 of the second metal electrode 211, and the third metal electrode 222 radiates the signal outward. It should be noted that the third metal electrode 222 is a plurality of radiator units independent from each other, and each radiator unit radiates signals outward.

In an embodiment, the third metal electrode 222 and the feeder line 241 are arranged in the same layer, that is, formed by the same process. In an exemplary embodiment, when a metal film layer is deposited on the second substrate 200, the third metal electrode 222 and the feeder line 241 are etched at the same time using a same mask plate. In another embodiment, the first metal electrode 111 and the wire 114 are arranged in a same layer. The first metal electrode 111 and the wire 114 are insulated from each other.

In an embodiment, a vertical projection of the light transmission area 213 on the first substrate 100 is not overlapped with neither a vertical projection of the first metal electrode 111 on the first substrate 100 nor a vertical projection of the wire 114 on the first substrate 100, avoiding the overlap of the vertical projection of the metal and the vertical projection of the light transmission area 213 to affect a cell thickness test. In an exemplary embodiment, the light transmission area 213 is arranged on both sides of each binding pad 112. Since no other metal structures are arranged on both sides of the binding pad 112, the cell thickness can be measured using such area of the first substrate 100, thereby improving the production yield of the liquid crystal antenna.

Figure 17:
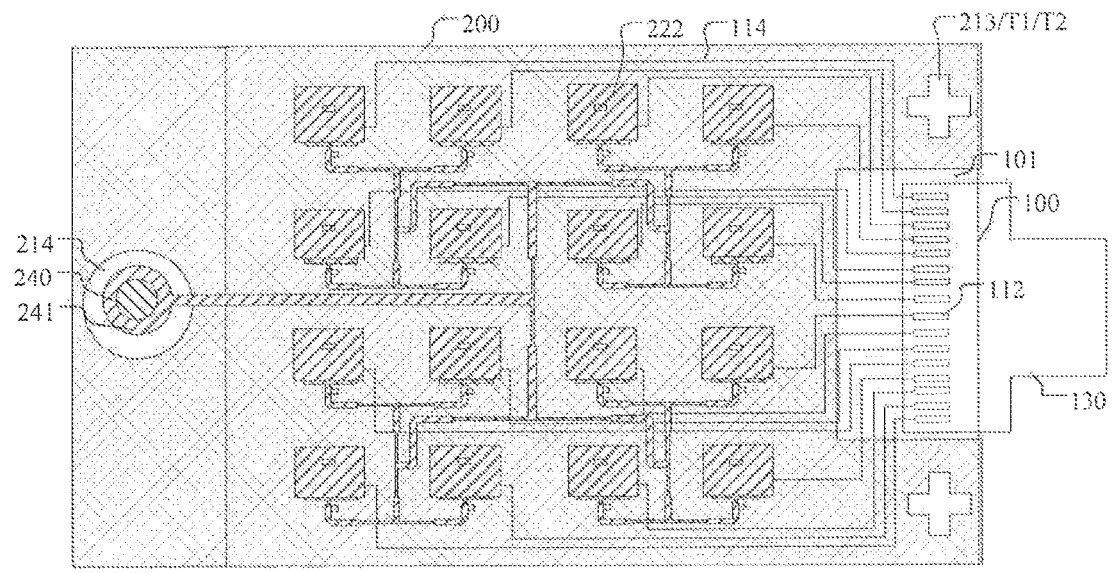
FIG. 17 is a structural diagram illustrating still another liquid crystal antenna according to an embodiment of the present application.

It should be noted that in the above drawings, although a shape of the light transmission area 213 is rectangular, the liquid crystal antenna provided by the embodiment of the present application is not limited to this, and the shape of the light transmission area 213 may also be square, circular, oval, polygonal, etc. In an exemplary embodiment, with reference to FIG. 17, the light transmission area 213 may be a cross-shaped structure, at the same time, the cross-shaped structure can be used as an alignment mark to align the first substrate 100 and the second substrate 200 to get fitted.

On the other hand, further provided is another type of liquid crystal antenna capable of measuring the cell thickness. In an embodiment, please refer to FIGS. 18 to 20, the liquid crystal antenna includes a first substrate 100, a second substrate 200, a liquid crystal layer 300, a first frame sealing structure 400, a first metal electrode 111, a driving circuit 130, a second metal electrode 211, and a third metal electrode 222. The first substrate 100 is oppositely arranged to the second substrate 200. The liquid crystal layer 300 is located between the first substrate 100 and the second substrate 200. The first frame sealing structure 400 is located between the first substrate 100 and the second substrate 200 and arranged around the liquid crystal layer 300, and the first substrate 100, the second substrate 200 and the first frame sealing structure 400 form a liquid crystal cell. The first metal electrode 111 is located on one side of the first substrate 100 facing toward the second substrate 200, and the first metal electrode 111 includes a plurality of microstrip line units 113. The driving circuit 130 is located within a step area 101 of the first substrate 100 beyond the second substrate 200, and the first metal electrode 111 is electrically connected to the driving circuit 130. The second metal electrode 211 is located on one side of the second substrate 200 facing toward the first substrate 100. The second metal electrode 211 includes a plurality of first hollow-out areas 212 and at least one third hollow-out area 215, and a vertical projection of one of the plurality of first hollow-out areas 212 on the second substrate 200 is located within a vertical projection of the first metal electrode 111 on the second substrate 200. The third metal electrode 222 is located on one side of the second substrate 200 facing away from the first substrate 100, and the vertical projection of the one of the plurality of the first hollow-out areas 212 on the second substrate 200 is located within a vertical projection of the third metal electrode 222 on the second substrate 200. A vertical projection of the third hollow-out area 215 on the first substrate 100 is not overlapped with neither the vertical projection of the first metal electrode 111 on the first substrate 100 nor the vertical projection of the third metal electrode 222 on the first substrate 100. The vertical projection of the first hollow-out area 212 and the vertical projection of the third hollow-out area 215 on the second substrate 200 are located within a vertical projection of the liquid crystal cell on the second substrate 200. In an exemplary embodiment, the first hollow-out area 212 is covered by the third metal electrode 222 and is located within a range of the first metal electrode 111.

In these methods provided by the embodiment of the present application, the first substrate 100 in the liquid crystal cell includes, in addition to the area where the first metal electrode 111 is located, the first light transmission area T1 without the first metal electrode 111. Since the second substrate within an area merely provided with the second metal electrode 211 is provided with the third hollow-out area 215 and the third hollow-out area 215 corresponds to a transparent area of the second substrate 200, that is, the second light transmission area T2, the sandwiched area 213 formed between the first light transmission area T1 and the second light transmission area T2 forms a light transmission area of the liquid crystal cell. In the above embodiment, due to existence of the light transmission area, the cell thickness test of the liquid crystal cell can be realized, thereby improving the production yield of the liquid crystal antenna.

Figure 18:
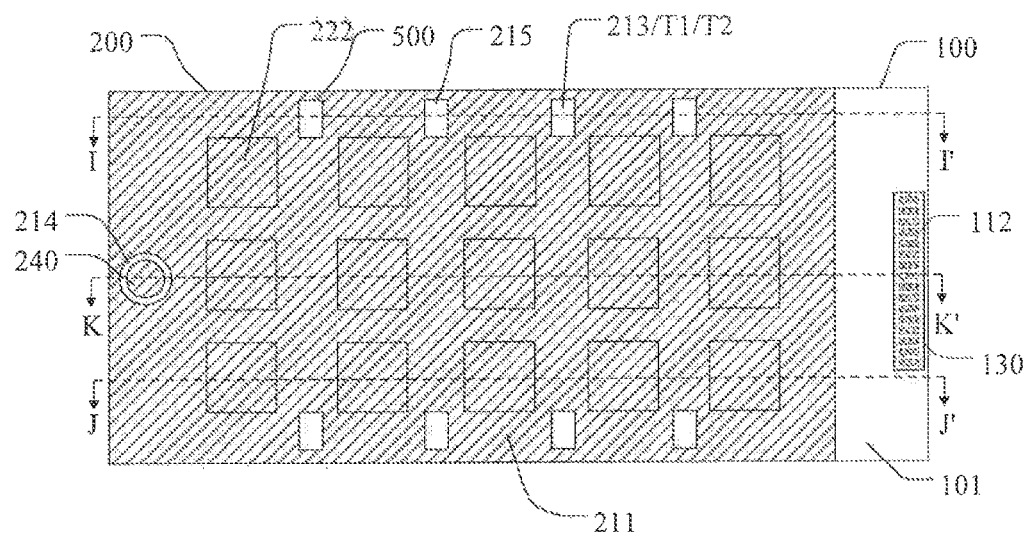
FIG. 18 is a structural diagram illustrating still another liquid crystal antenna according to an embodiment of the present application.
Figure 20:
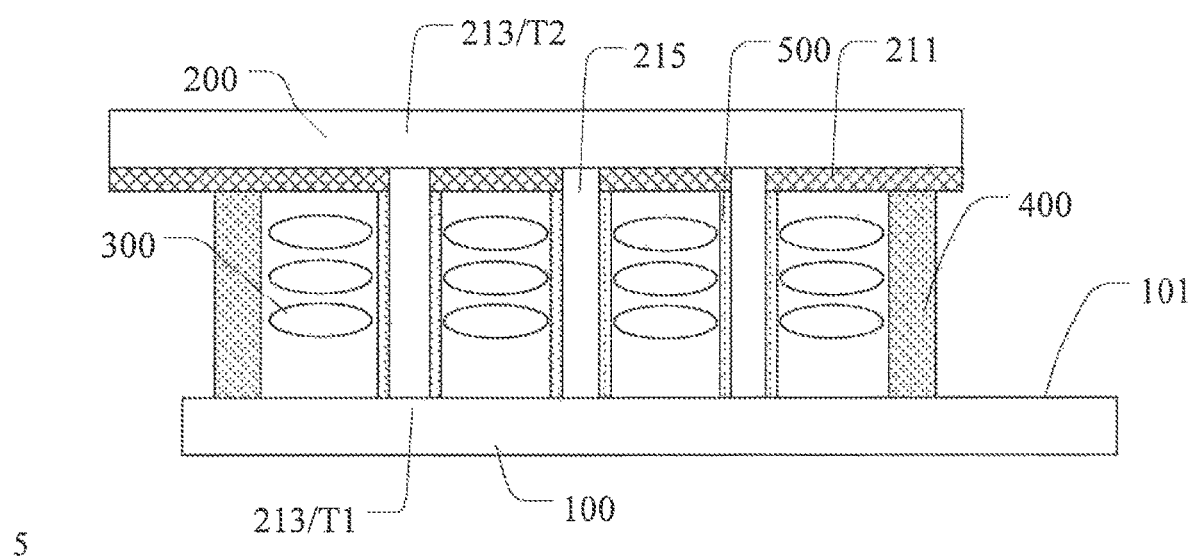
FIG. 20 is another sectional diagram taken along II' of FIG. 18.
Figure 21:
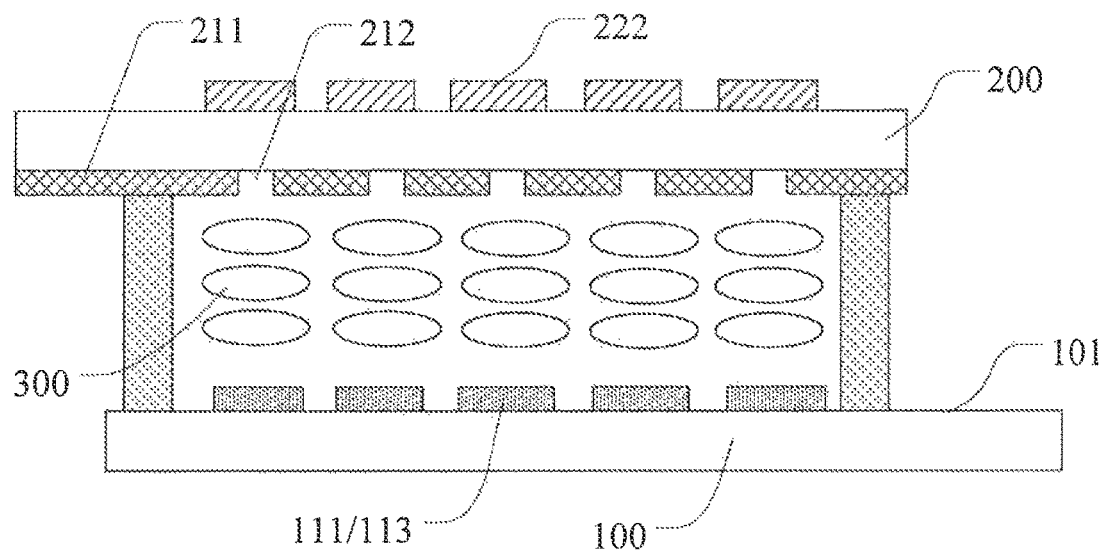
FIG. 21 is a sectional diagram taken along JJ' of FIG. 18.

In an embodiment, with continued reference to FIGS. 18 and 20, the liquid crystal antenna further includes an annular barrier 500 located in the liquid crystal layer 300, and an area surrounded by the annular barrier 500 overlaps with the third hollow-out area 215. The liquid crystal layer 300 can be separated by arranging the annular barrier 500, so that liquid crystal molecules cannot enter the light transmission area, thereby further improving accuracy of the measurement of the cell thickness. Moreover, due to the arrangement of the annular barrier 500, the waste of the liquid crystal is avoided, thereby further reducing the manufacturing cost.

In another embodiment, the barrier 500 and the first frame sealing structure 400 are made of the same material. The barrier 500 and the first frame sealing structure 400 have the same function. Therefore, the same material can be used, which enables the barrier 500 and the first frame sealing structure 400 to be formed in the same manufacturing process, avoiding increasing production costs and manufacturing processes. In an exemplary embodiment, the barrier 500 and the first frame sealing structure 400 are made of a frame sealant material and formed by a coating and curing process.

Figure 19:
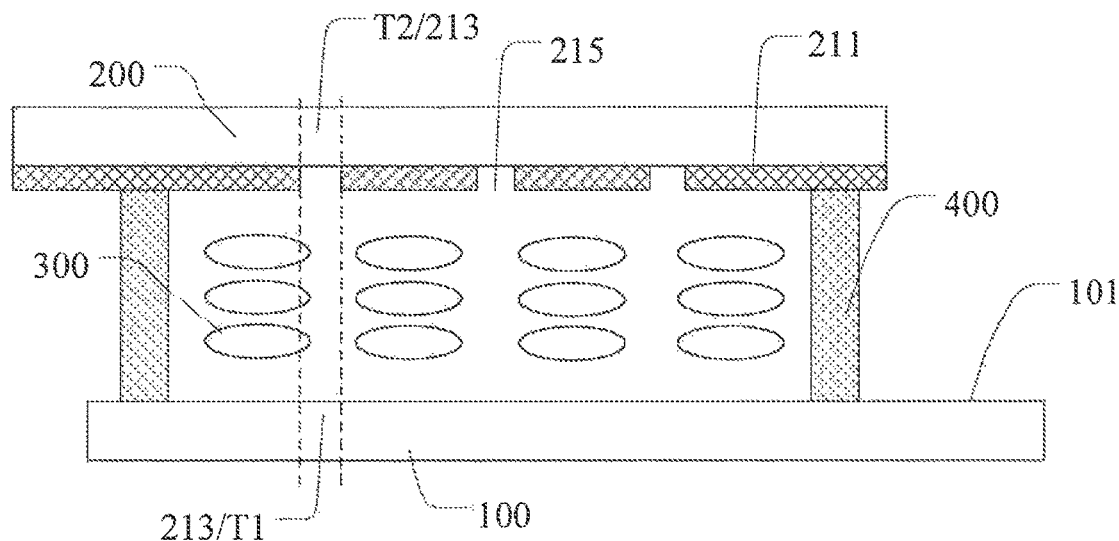
FIG. 19 is a sectional diagram taken along II' of FIG. 18.
Figure 22:
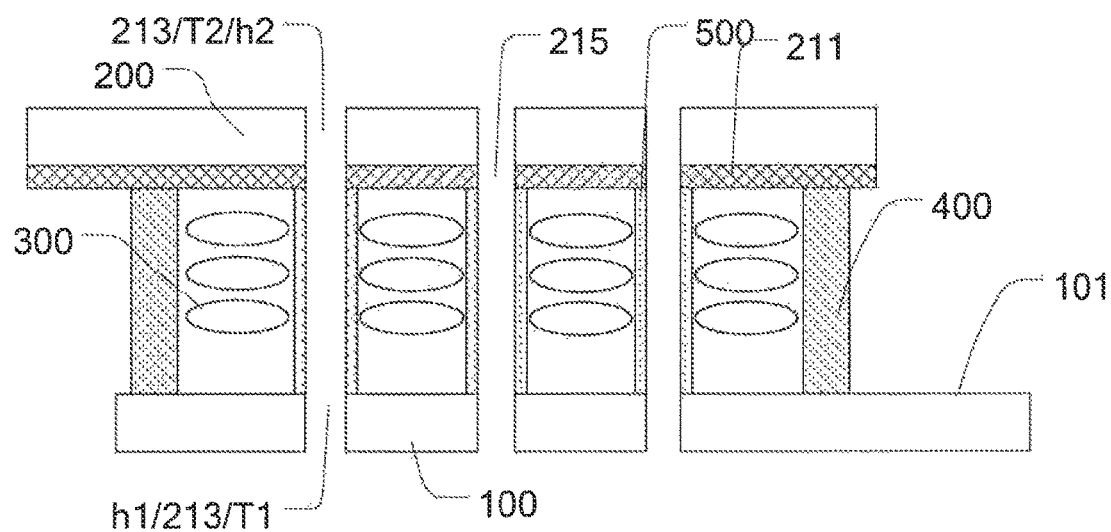
FIG. 22 is still another sectional diagram taken along II' of FIG. 18.

It should be noted that in FIGS. 19 and 20, the first substrate 100 and the second substrate 200 are continuous structures, and because the liquid crystal layer 300 is made of a transparent material, light can pass through the liquid crystal cell during measuring the cell thickness. However, the embodiment of the present application is not limited to this. In an embodiment, referring to FIG. 22, the first substrate 100 and the second substrate 200 may also be hollow-out areaed-out structures. The hollow-out areaed-out structures of the first substrate 100 and the second substrate 200 correspond to the third hollow-out area 215 of the second metal electrode 211, that is, coincident with the sandwiched area 213 formed between the first transmission area T1 and the second transmission area T2. In an exemplary embodiment, the hollow-out areaed-out structure of the first substrate 100 is a first through hole h1, the hollow-out areaed-out structure of the second substrate 200 is a second through hole h2. The first through hole h1 overlaps with a vertical projection of the second through hole h2 on the first substrate 100, the first through hole h1 is overlapped with a vertical projection of the third hollow-out area 215 on the first substrate 100, and the second through hole h2 is overlapped with a vertical projection of the third hollow-out area 215 on the second substrate 200.

In an embodiment, the first through hole h1 of the first substrate 100 and the second through hole h2 of the second substrate 200 may be fabricated after the liquid crystal cell is formed. In an exemplary embodiment, a barrier is formed between the first substrate 100 and the second substrate 200, and after the liquid crystal cell is formed, an area provided with the barrier is perforated, and part of the first substrate 100, part of the second substrate 200 and part of the barrier are removed, thereby forming the hollow-out areaed-out structures of the first substrate 100 and the second substrate 200, and the annular barrier 500.

Figure 23:
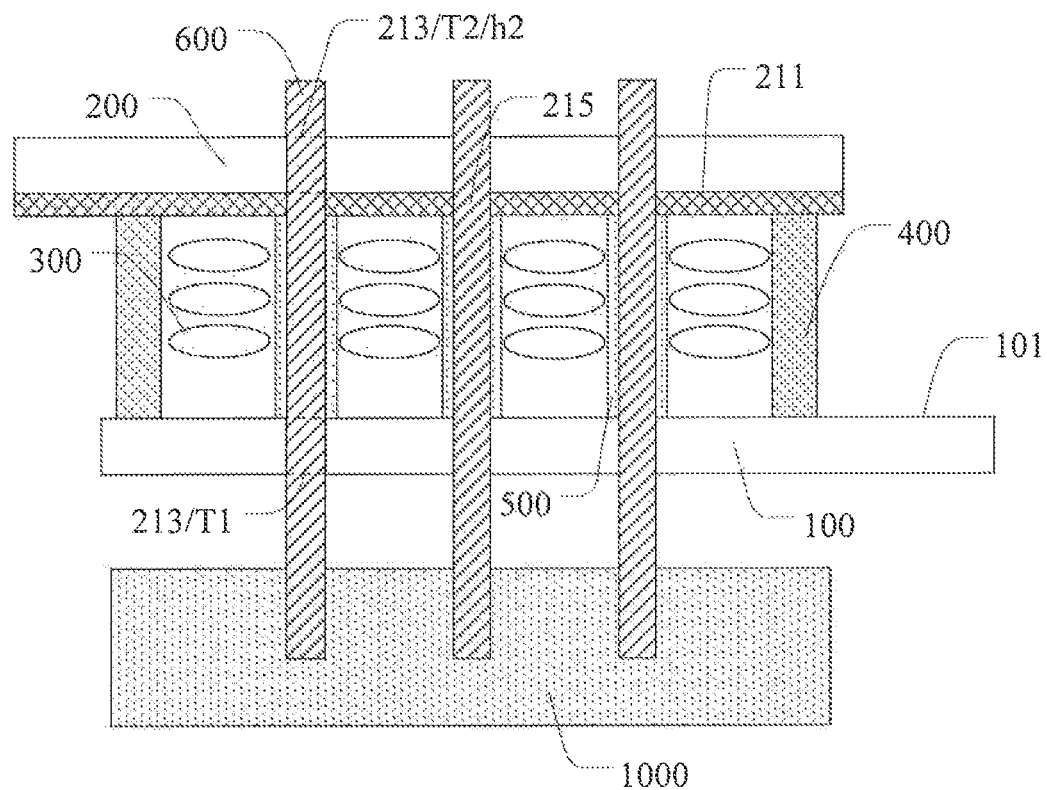
FIG. 23 is a structural diagram illustrating still another liquid crystal antenna according to an embodiment of the present application.

In an embodiment, please refer to FIG. 23, the liquid crystal antenna provided by the embodiment of the present application further includes a fixed device 1000, and a fixed rod 600 penetrates through the first through hole h1 and the second through hole h2 and is connected to the fixed device 1000. The fixed device 1000 is provided with a groove capable of accommodating the fixed rod 600, and the fixed rod 600 is provided with a fixed structure at a connection position with the groove. In an exemplary embodiment, the fixed rod 600 may be provided with a thread at the connection position with the groove, and the groove of the fixed device is also internally provided with a thread matching the fixed rod 600. The liquid crystal antenna needs to be fixed on other devices during use. Therefore, the liquid crystal antenna is fixed to other devices through adhesive glue, or a card slot is provided on other devices to place the liquid crystal antenna. While, in the present embodiment, the first through hole h1 and the second through hole h2 formed by a perforating method can not only realize the cell thickness test of the liquid crystal cell but also be used to place the fixed rod 600 to achieve fixation with other devices.

In an embodiment, the liquid crystal layer 300 is made of polymer liquid crystal, and the barrier 500 is formed by polymers in the polymer liquid crystal. In an exemplary embodiment, the polymer liquid crystal is that a polymer monomer is added to the liquid crystal molecule, and after the liquid crystal cell is formed, ultraviolet light is used to irradiate from one side of the second substrate 200, then the polymer monomers within an area irradiated by the ultraviolet light polymerize to form the barrier 500. Finally, a perforating process is used to form the structure illustrated in FIG. 22. In the present embodiment, compared with the process for manufacturing the liquid crystal antenna in the related art, it is merely necessary to add a step of ultraviolet irradiation and a step of perforation, without setting a separate manufacturing step for the barrier. It is important that one side of the second substrate 200 corresponding to an interior of the liquid crystal cell is opaque except for a position of the third hollow-out area 215.

Therefore, so as long as light is incident from one side of the second substrate 200, the barrier 500 can be formed at the position of the third hollow-out area 215 without arranging the mask plate, that is, production of the annular barrier 500 does not need the mask plate, thereby saving the production cost.

Figure 24:
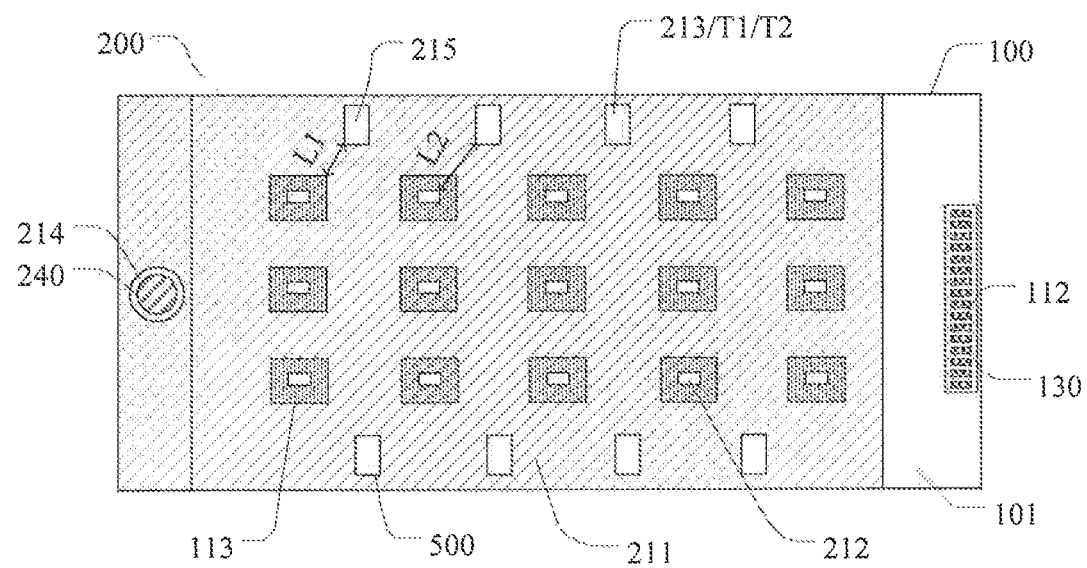
FIG. 24 is a structural diagram illustrating still another liquid crystal antenna according to an embodiment of the present application.

With continued reference to FIG. 24, in order to clearly illustrate position relationships between the first hollow-out area 212, the third hollow-out area 215 and the microstrip line unit 113, some necessary structures are omitted in the figure. As illustrated in FIG. 24, a minimum distance between the third hollow-out area 215 and the microstrip line unit 113 is L1, and L1≥200 μm. The third hollow-out area 215 is formed by patterning and by etching the second metal electrode 211. The second metal electrode 211 is used to prevent a signal in the liquid crystal cell from leaking outward, and a signal transmitted by the microstrip line unit 113 can be prevented from leaking outward through the third hollow-out area 215 by controlling the minimum distance L1 between the third hollow-out area 215 and the microstrip line unit 113.

In an embodiment, with continued reference to FIG. 24, a minimum distance between the third hollow-out area 215 and the first hollow-out area 212 is L2, and L2≥200 μm. The first hollow-out area 212 is a hollow-out area of the second metal electrode 211. The signal of the microstrip line unit 113 can be coupled to the third metal electrode 222 through the first hollow-out area 212, and the third metal electrode 222 radiates the signal outward. The signal that should have been coupled from the first hollow-out area 212 to the third metal electrode 22 is avoided from leaking from the third hollow-out area 215 by increasing the distance between the third hollow-out area 215 and the first hollow-out area 212, thereby avoiding reducing the performance of the liquid crystal antenna.

Figure 25:
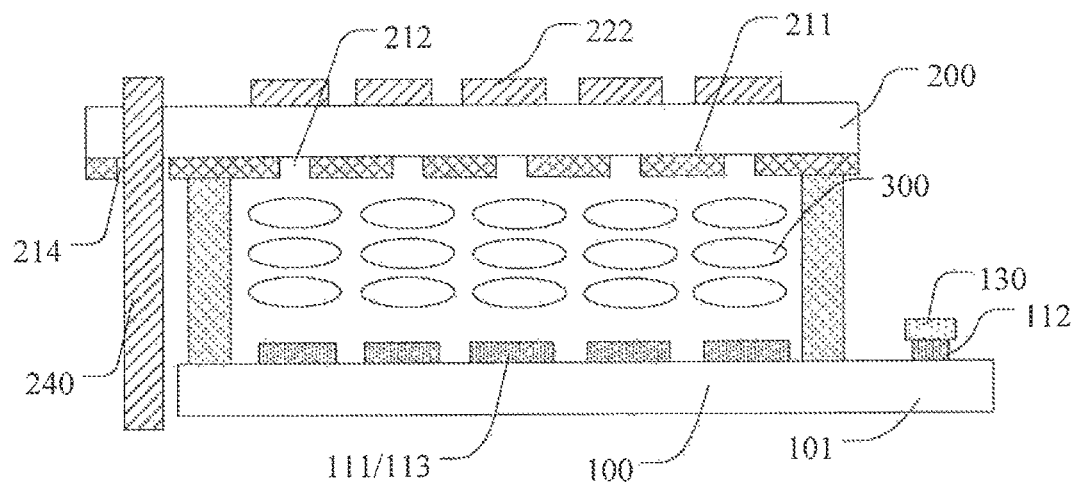
FIG. 25 is a sectional diagram taken along KK' of FIG. 18.

In an embodiment, please refer to FIGS. 18 and 25, the liquid crystal antenna further includes the signal introduction area of the second substrate 200 beyond the first substrate 100, and the signal introduction area includes the through hole running through the second substrate 200. The second metal electrode 211 is provided with the second hollow-out area 214 within the signal introduction area, and the through hole is located within the second hollow-out area 214. The signal introduction rod 240 penetrates through the through hole. The signal introduction rod 240 is used to provide the high frequency signal to the liquid crystal antenna, and the high frequency signal is transmitted through a feeder electrode and coupled to the microstrip line unit 113. It should be noted that a section of FIG. 18 at KK' and a section of FIG. 4 at EE' have a same structure. Therefore, structures illustrated in FIGS. 9 and 25 are the same.

Figure 26:
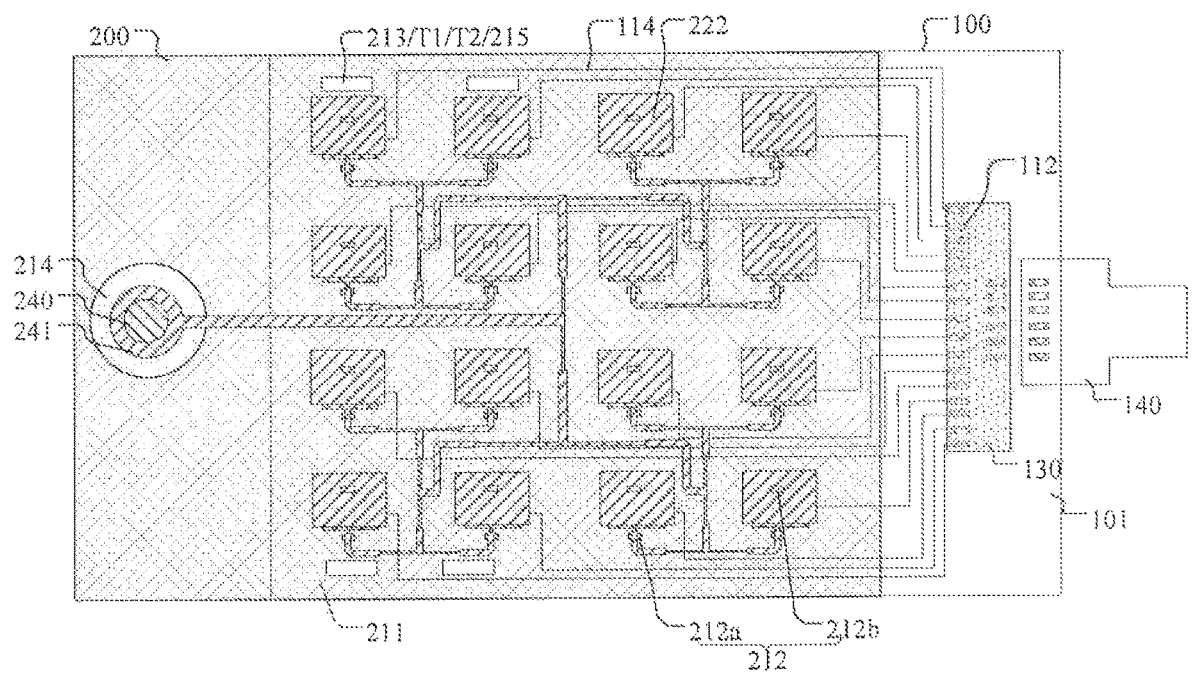
FIG. 26 is a structural diagram illustrating still another liquid crystal antenna according to an embodiment of the present application.

In an embodiment, with reference to FIG. 26, the liquid crystal antenna further includes a flexible circuit board 140, and the flexible circuit board 140 is bindingly connected to the driving circuit 130. The flexible circuit board 140 is a medium for connecting the liquid crystal antenna with an external circuit. The flexible circuit board 140 is capable of transmitting a signal source to the liquid crystal antenna through the external circuit, and rotation of the liquid crystal can be adjusted by controlling the signal source, thereby controlling a radiation direction and radiation amount of the signal.

In FIGS. 18 to 25, in order to clearly illustrate position relationships between the first metal electrode 111, the second metal electrode 211, the third metal electrode 222, and each hollow-out area arranged on the second metal electrode 211, part of the structure has not yet been illustrated. However, the liquid crystal antenna provided by the embodiment of the present application still includes necessary structures for realizing the function of the antenna.

In an embodiment, please further refer to FIG. 26, the first substrate 100 is further provided with the wires 114 for connecting the respective binding pads 112 with the respective microstrip line units 113. The wires 114 connected to the respective microstrip line units 113 are insulated from each other and connected to the different binding pads 112. The second substrate 200 is provided with the feeder line 241 electrically connected to the signal introduction rod 240. The feeder line 241 is distributed in the dendritic shape and includes a plurality of branches, and the vertical projection of one branch of the feeder line 241 on the second baseplate 200 partially overlaps with the vertical projection of one microstrip line unit 113 on the second baseplate 200. The feeder line 241 couples the high frequency signal of the signal introduction rod 240 to the microstrip line unit 113, and the signal transmitted in the microstrip line unit 113 is controlled by controlling deflection of the liquid crystal layer 300. Finally, the signal is coupled to the third metal electrode 222 at the first hollow-out area 212 of the second metal electrode 211, and the third metal electrode 222 radiates the signal outward. It should be noted that the third metal electrode 222 is a plurality of radiator units independent from each other, and each radiator unit radiates signals outward.

As illustrated in FIG. 26, the first hollow-out area 212 includes a first division 212a, and a vertical projection of the first division 212a on the second substrate 200 is overlapped with the vertical projections of the feeder line 241 and a second division 212b on the second substrate 200. At a position of the first division 212a, the feeder line 241 couples the high frequency signal to the microstrip line unit 113. At a position of the second division 212b, the microstrip line unit 113 couples the signal to the third metal electrode 222. Finally, the signal is radiated outward from the third metal electrode 222.

Figure 27:
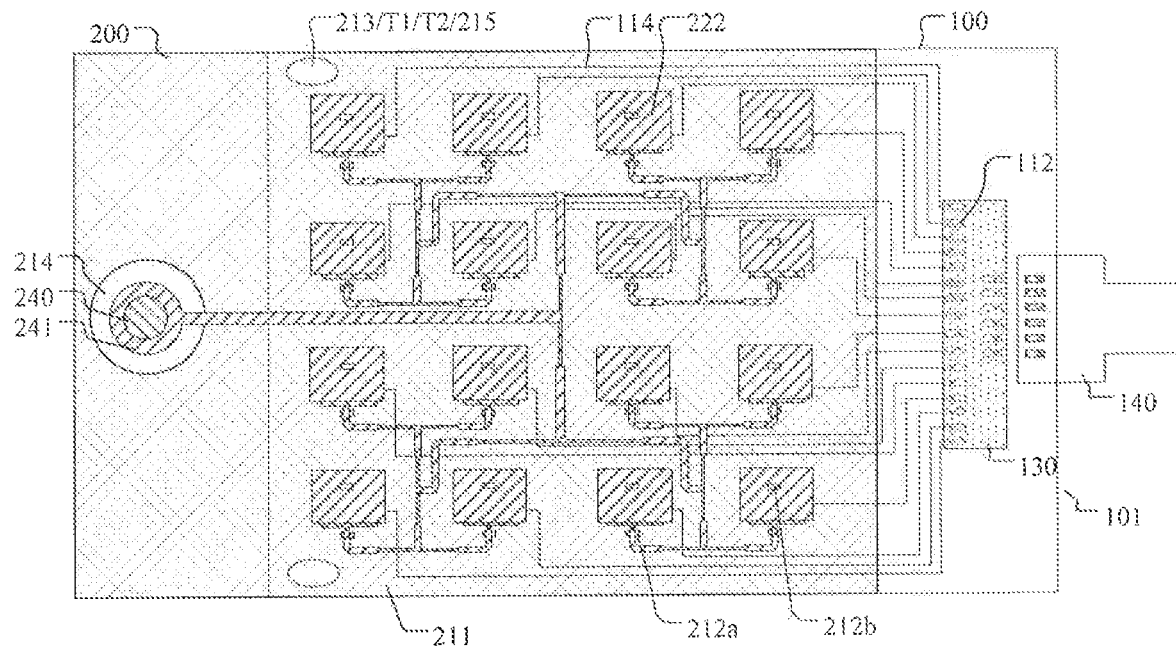
FIG. 27 is a structural diagram illustrating still another liquid crystal antenna according to an embodiment of the present application.
Figure 28:
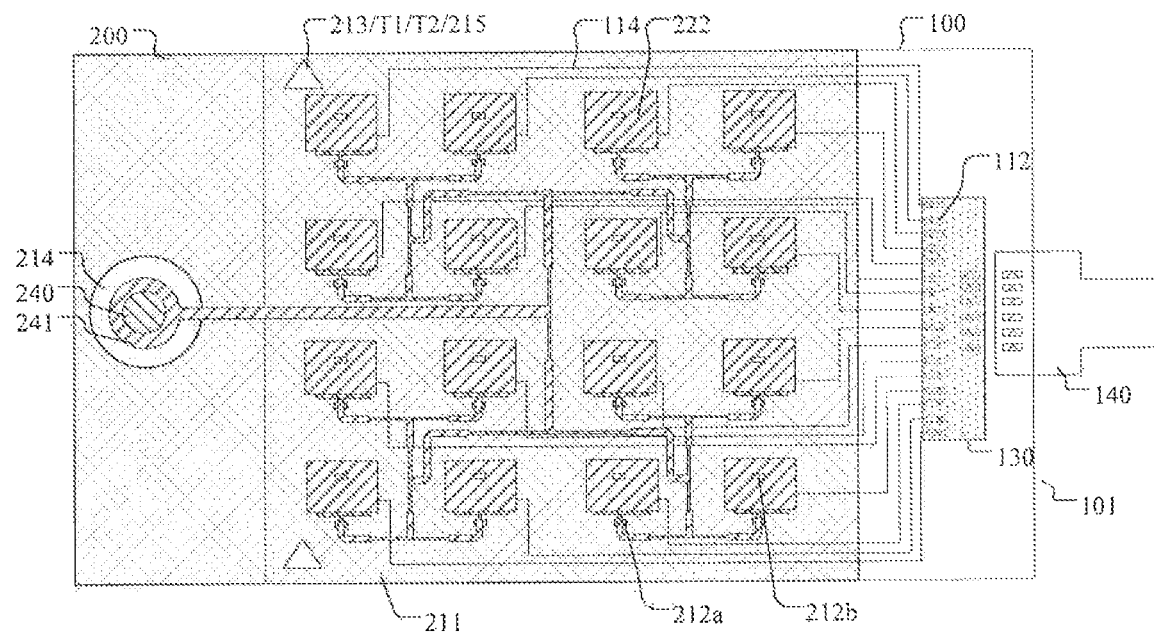
FIG. 28 is a structural diagram illustrating still another liquid crystal antenna according to an embodiment of the present application.

A shape of the third hollow-out area 215 is not limited to the rectangle shape shown in FIG. 26, but also includes other shapes, such as the oval or circular shape shown in FIG. 27, or the triangle shape shown in FIG. 28. Apparently, the third hollow-out area 215 can also be a polygon of other shapes and can be reused as the alignment mark, for example, the third hollow-out area 215 can be cross-shaped like the sandwiched area 213 shown in FIG. 17.

Figure 29:
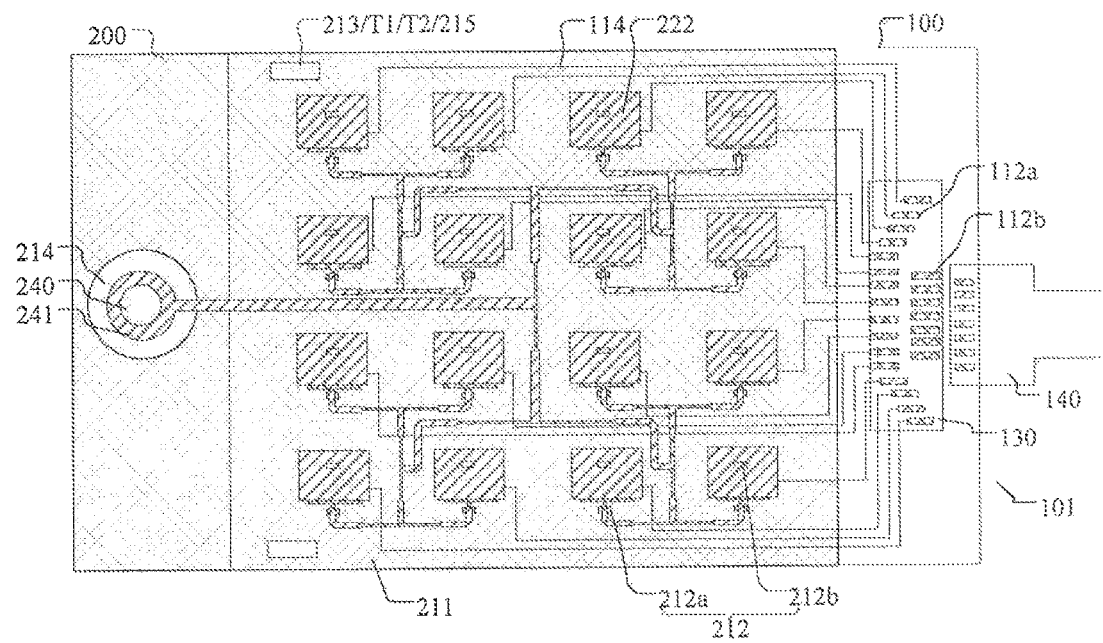
FIG. 29 is a structural diagram illustrating still another liquid crystal antenna according to an embodiment of the present application.

In an embodiment, as illustrated in FIG. 29, the driving circuit 130 includes the binding pad 112, the binding pad 112 includes an input pad 112b and an output pad 112a, and the output pad 112b is connected to the flexible circuit board 140. When application of liquid crystal antenna is more extensive, more liquid crystal antenna units are needed, while it is also necessary to maintain lightness, thinness and miniaturization. Therefore, structures of other non-liquid crystal units should not take up too much space. In order to further reduce a frame binding on one side of the driving circuit 130, the output pads 112a on both sides of the driving circuit 130 are sunk to one side of the input pads 112b.

It should be noted that in the above embodiment, when an overlapping light transmission area is arranged on the first substrate 100 and the second substrate 200 in the liquid crystal cell, in order to prevent leakage of the high frequency signals, it is necessary to maintain a certain distance between the light transmission area and a functional area of the liquid crystal antenna. The functional area of the liquid crystal antenna includes the microstrip line unit, the feeder line and a radiation electrode. In order to further improve an amount of radiation signals of the liquid crystal antenna, a transparent conductor electrically connected to a corresponding metal electrode can be arranged within the light transmission area. In an embodiment, a transparent conductor, such as transparent indium tin oxide, is arranged within the second transparent area T2. The transparent conductor is electrically connected to the second metal electrode 211. In another embodiment, a whole surface of indium tin oxide is firstly arranged on the second substrate 200, and then the metal film layer is deposited, the second metal electrode 211 and each hollow-out area are obtained by patterning the metal film layer, and the metal film layer at the position of the second light transmission area T2 is etched out. In the present embodiment, the indium tin oxide in the second light transmission area T2 can replace a function of the ground electrode (the second metal electrode) in the related art, thereby preventing signal leakage.

Figure 30:
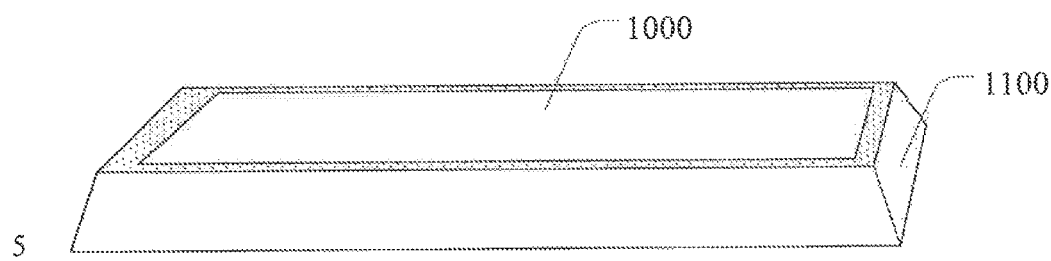
FIG. 30 is a structural diagram illustrating a communication device according to an embodiment of the present application.

On the other aspect, further provided is a communication device, including the liquid crystal antenna of any one of the above embodiments. Referring to FIG. 30, the communication device includes a liquid crystal antenna 1000 and a housing 1100 for accommodating the liquid crystal antenna 1000. The communication device can be placed inside a car so that the car can receive a signal.

Further provided is a manufacturing method for the liquid crystal antenna. In an embodiment, please refer to FIGS. 31 to 35. The manufacturing method for the liquid crystal antenna provided by the embodiment of the present application is described as follows.

In step S11, the first substrate 100 and the second substrate 200 are provided, and the first metal electrode 111, the line connected to the driving circuit and the first light transmission area are formed on the first substrate 100. The first metal electrode 111 includes a plurality of microstrip line units 113, and the line connected to the driving circuit includes the binding pad 112. It should be noted that, on the first substrate 100, an area without the first metal electrode 111 and the line connected to the driving circuit can be used as the first light transmission area.

In step S12, the second metal electrode 211 are formed on one side of the second substrate 200 and a second light transmission area T2 is formed within an area of the second substrate 200 beyond the first frame sealing structure 400, and the second metal electrode 211 includes a plurality of first hollow-out areas 212. The second metal electrode 211 is formed, meanwhile, the first hollow-out area 212, the second hollow-out area 214 and the second light transmission area T2 are formed. The second metal electrode 211 needs to be hollow-out areaed out at the position of the second light transmission area T2.

In step S13, the third metal electrode 222 is formed on another side of the second substrate 200. The vertical projection of the first hollow-out area 212 on the second substrate 200 is located within the vertical projection of the third metal electrode 222 on the second substrate 200, and the vertical projection of the third metal electrode 222 on the second baseplate 200 is not overlapped with the second light transmission area T2. It should be noted that the third metal electrode 222 is formed, meanwhile, the feeder line 241 is formed, that is, the third metal electrode 222 and the feeder line 241 are located in a same metal layer, and the third metal electrode 222 and the feeder line 241 are formed simultaneously through the same process. The first hollow-out area 212 formed in step S12 includes the first division 212a, the vertical projection of the first division 212a on the second substrate 200 is overlapped with the vertical projections of the feeder line 241 and the second division 212b on the second substrate 200. At the position of the first division

212a, the feeder line 241 couples the high frequency signal to the microstrip line unit 113. At the position of the second division 212b, the microstrip line unit 113 couples the signal to the third metal electrode 222. Finally, the signal is radiated outward from the third metal electrode 222.

In step S14, the first substrate 100 formed with the first metal electrode 111, the line connected to the driving circuit and the first light transmission area T1, and the second substrate 200 formed with the second metal electrode 211, the second light transmission area T2 and the third metal electrode 222 are aligned into a cell to form the liquid crystal cell, so that the first frame sealing structure 400 and the liquid crystal layer are arranged between the first substrate 100 and the second substrate 200, the first frame sealing structure 400 is arranged around the liquid crystal layer, and a vertical projection of the first light transmission area T1 is overlapped with a vertical projection of the second light transmission area T2.

In step S15, the second substrate 200 is cut, so that the first substrate 100 exposes the line connected to the driving circuit. The driving circuit 130 is electrically connected to a connecting line.

Figure 32:
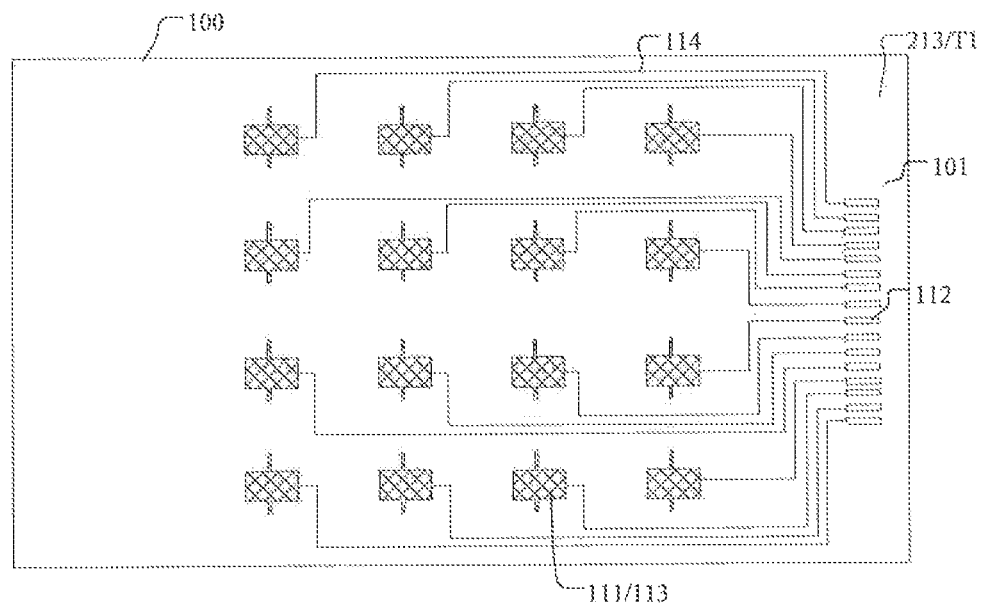
FIGS. 32 to 35 are structural diagrams illustrating an intermediate process of the manufacturing method for the liquid crystal antenna according to an embodiment of the present application.
Figure 33:
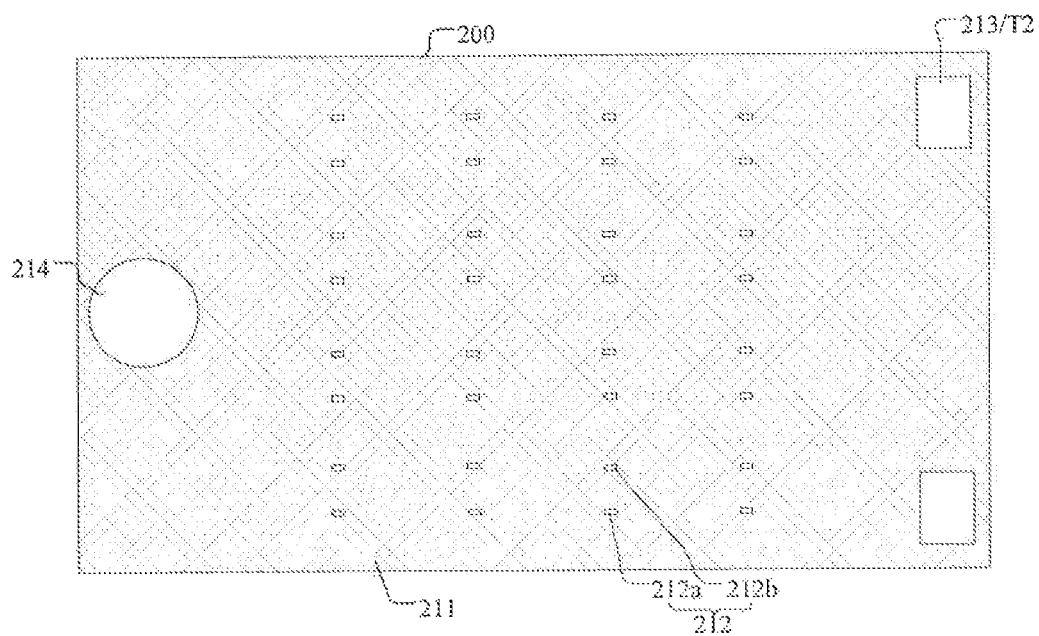
Figure 34:
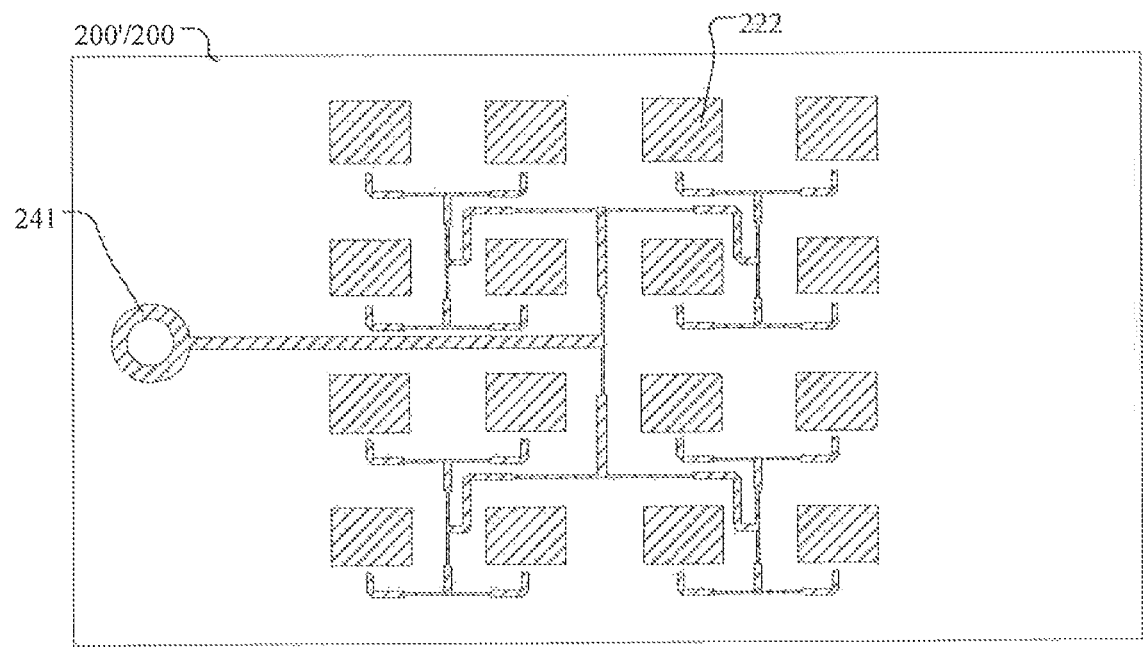
Figure 35:
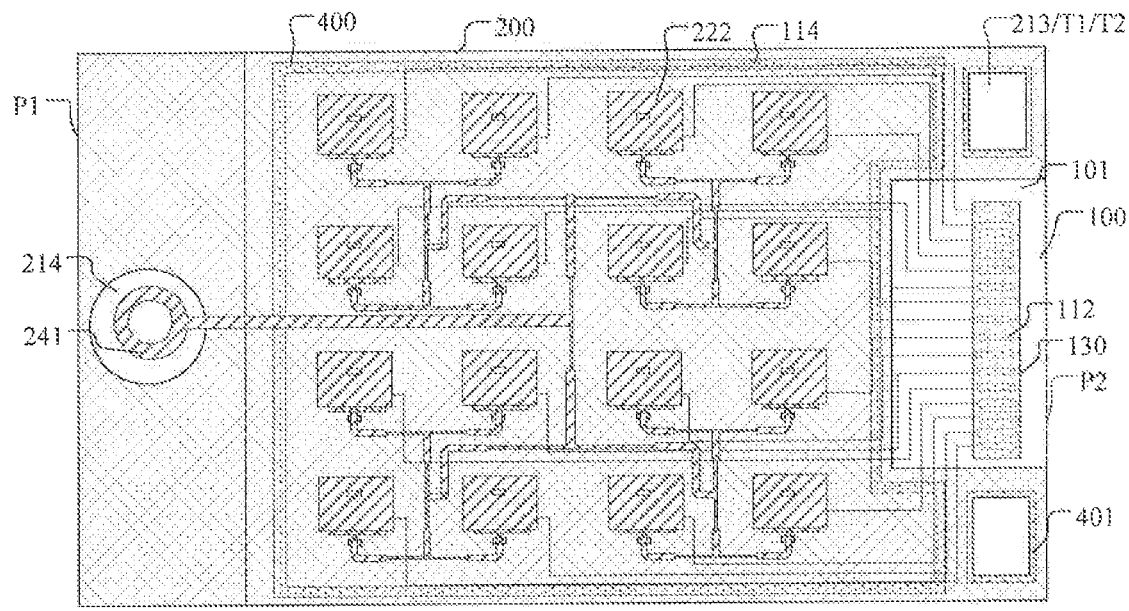
Figure 36:
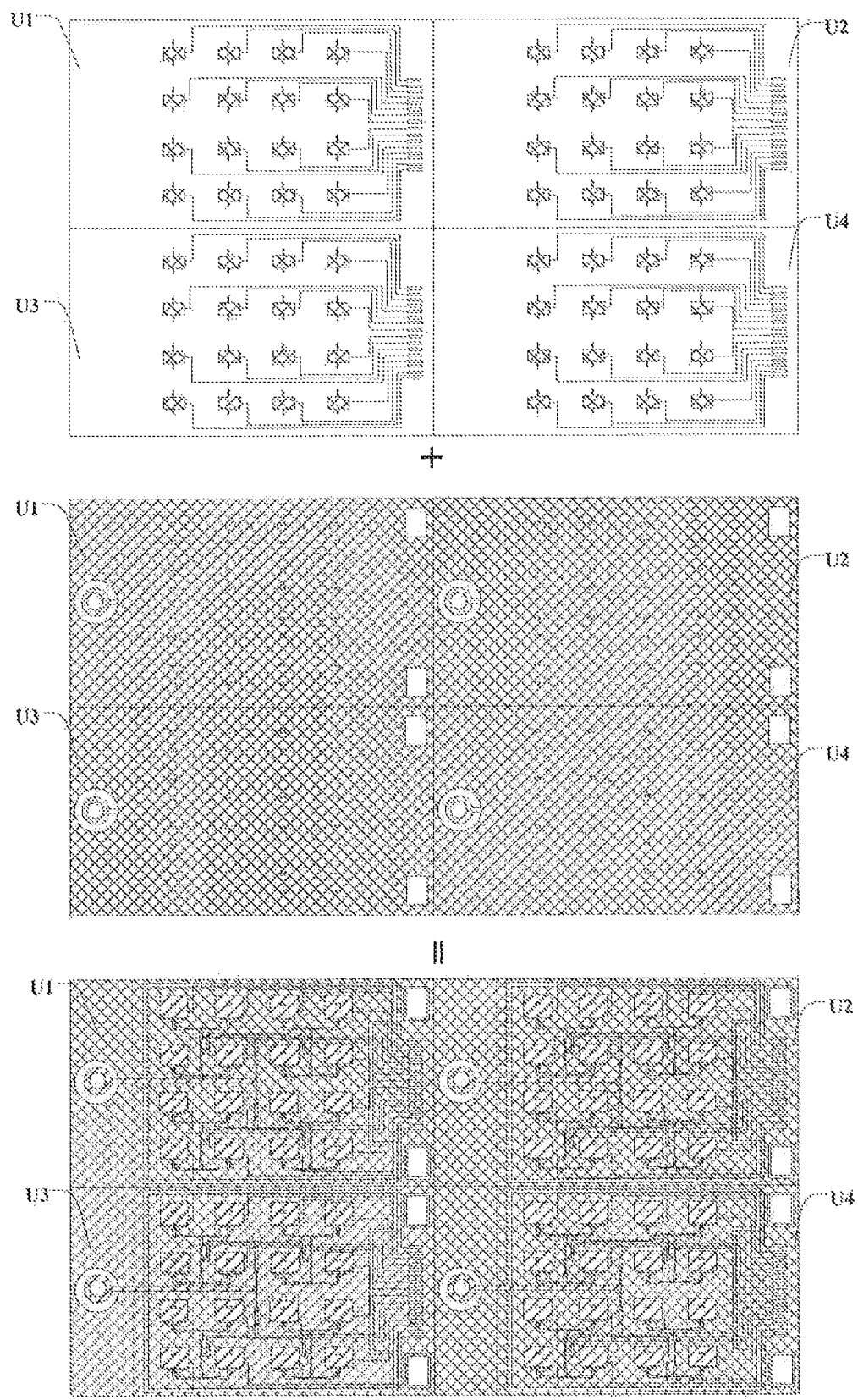
FIG. 36 is a structural diagram illustrating an intermediate process of another manufacturing method for a liquid crystal antenna according to an embodiment of the present application.
Figure 38:
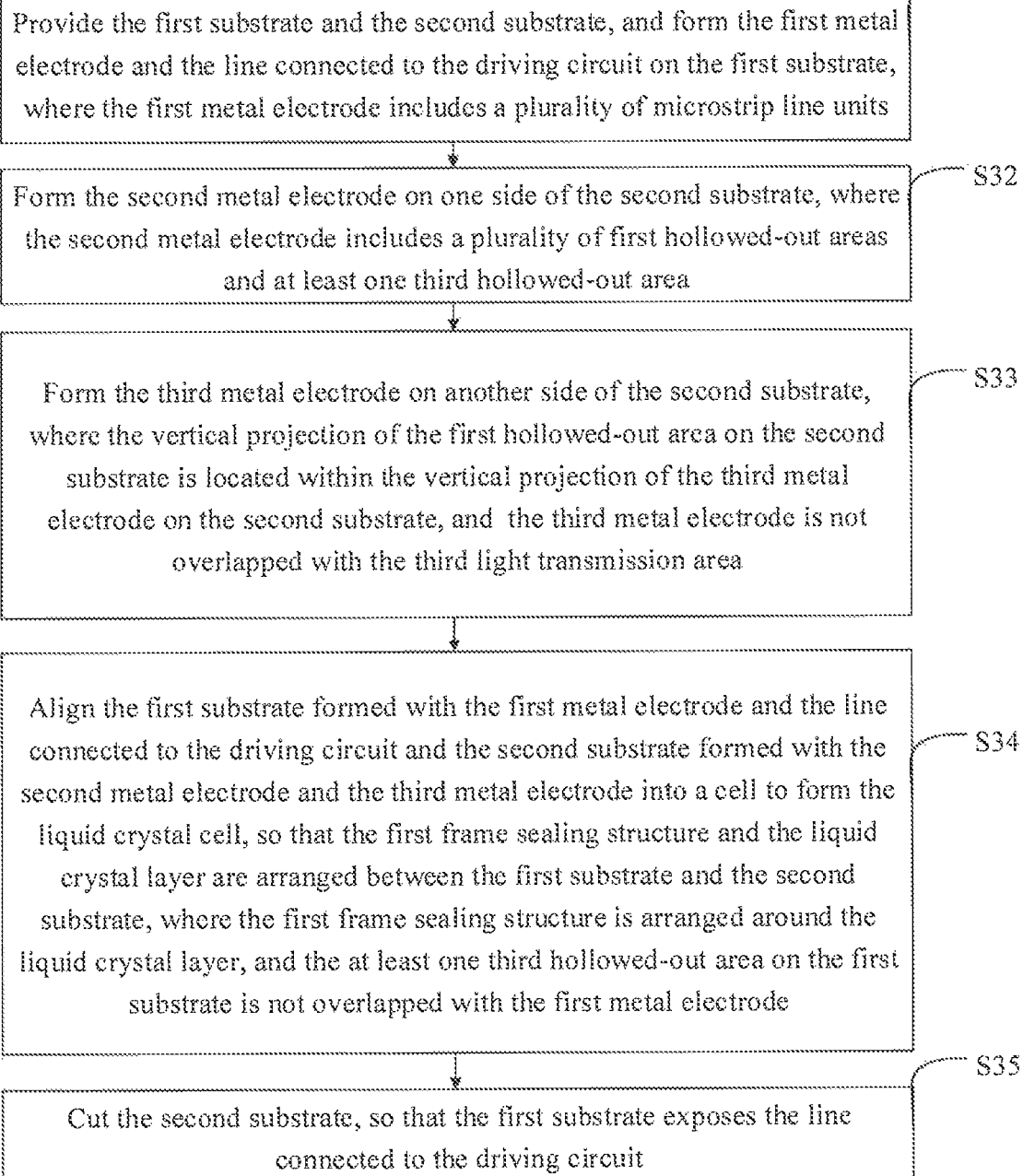
FIG. 38 is a flow chart illustrating still another manufacturing method for a liquid crystal antenna according to an embodiment of the present application.
Figure 39:
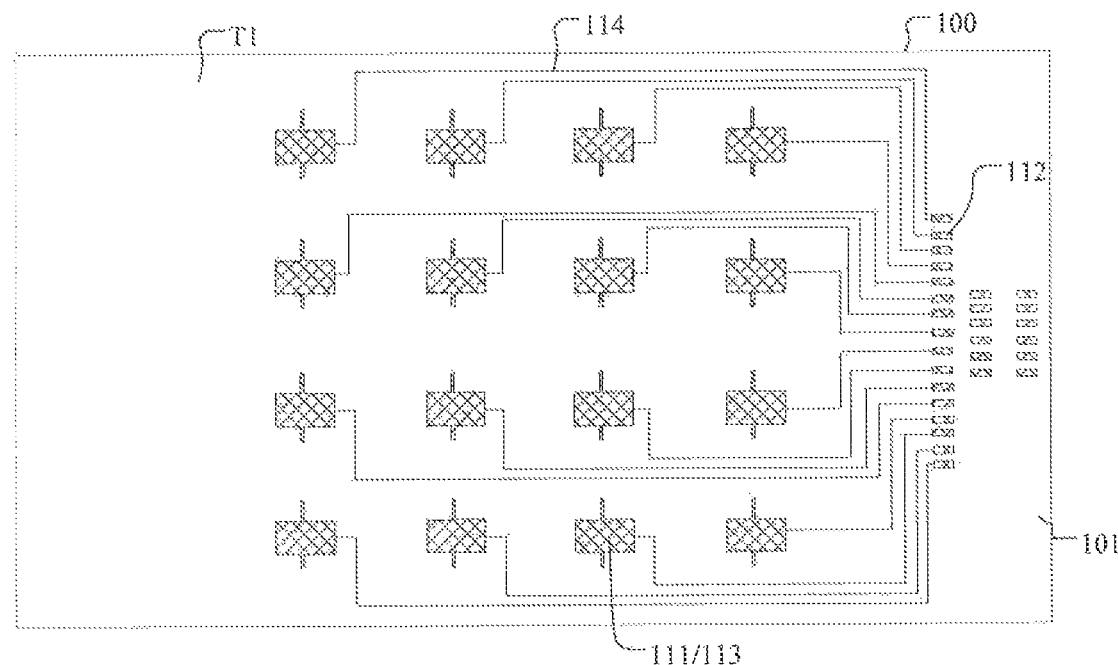
FIGS. 39 to 42 are structural diagrams illustrating still another manufacturing method for a liquid crystal antenna according to an embodiment of the present application.
Figure 40:
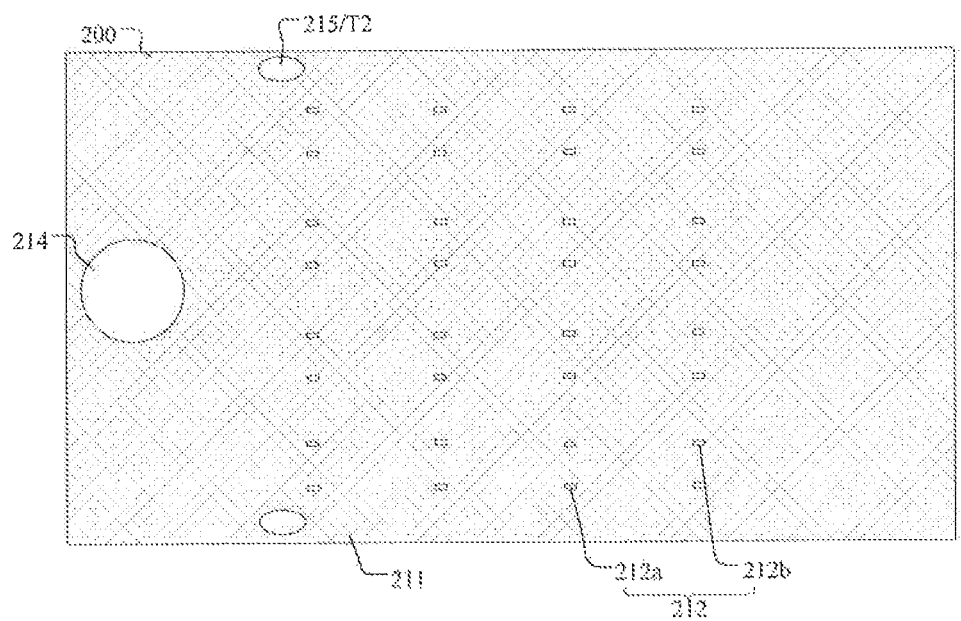
Figure 41:
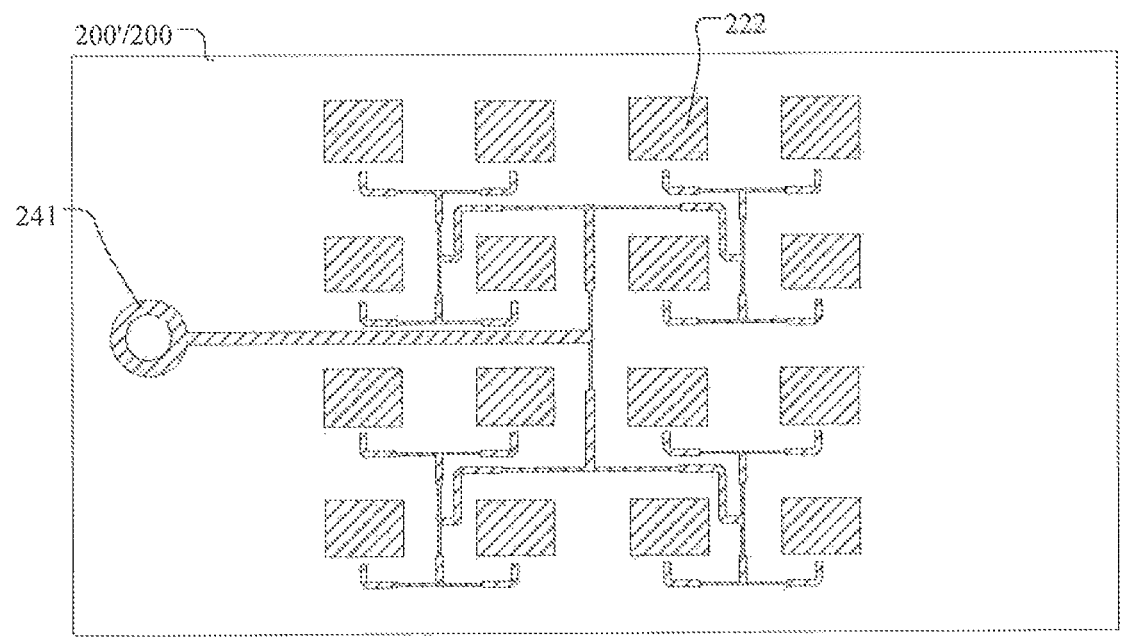

It should be noted that FIGS. 32 to 35 illustrate a formation process of a single liquid crystal antenna. In an actual production process, in order to improve production efficiency, a plurality of liquid crystal antennas are usually produced through one production process. In an embodiment, please see FIG. 36, in step S11, a plurality of units are formed on a large substrate (a large piece of substrate), and each unit includes the structure as shown in FIG. 32. In an exemplary embodiment, the large piece of substrate includes 4 units: a first unit U1, a second unit U2, a third unit U3, and a fourth unit U4. Each unit is provided with a microstrip line unit, a connecting line and a binding terminal. In step S12, similarly, a plurality of units are formed on a large substrate (a large piece of substrate), and each unit includes the structure as shown in FIG. 33, for example, the first unit U1, the second unit U2, the third unit U3, and the fourth unit U4. In step S13, a plurality of structures corresponding to FIG. 34 are formed on the other side of the large piece of substrate used in step S12, that is, structures as shown in FIG. 34 are formed at positions of the first unit U1, the second unit U2, the third unit U3 and the fourth unit U4. In step S14, after two large pieces of substrate are aligned into a cell, a plurality of liquid crystal cells are formed, and the plurality of liquid crystal cells correspond to the first unit U1, the second unit U2, the third unit U3 and the fourth unit U4, respectively. When the large piece of substrate is used for manufacture, the large piece of substrate after aligned into a cell needs to be cut to obtain a single liquid crystal antenna before step S15. In another exemplary embodiment, the liquid crystal cells corresponding to the first unit U1, the second unit U2, the third unit U3 and the fourth unit U4 are cut and separated. Therefore, step S15 is to cut a single liquid crystal cell so as to expose the line connected to the driving circuit.

In an embodiment, further provided is another manufacturing method for the liquid crystal antenna. Please refer to FIGS. 32 to 37, the manufacturing method for the liquid crystal antenna includes the following steps.

In step S21, the first substrate 100, the second substrate 200 and the third substrate 200' are provided, and the first metal electrode 111, the line connected to the driving circuit and the first light transmission area T1 are formed on the first substrate 100. The first metal electrode 111 includes a plurality of microstrip line units 113.

In step S22, the second metal electrode 211 is formed on one side of the second substrate 200 and a second light transmission area T2 is formed within an area of the second substrate 200 beyond the first frame sealing structure 400, and the second metal electrode 211 includes a plurality of first hollow-out areas 212. The second metal electrode 211 is formed, meanwhile, the first hollow-out area 212, the second hollow-out area 214 and the second light transmission area T2 are formed, and the second metal electrode 211 needs to be hollow-out areaed out at the position of the second light transmission area T2.

In step S23, the third metal electrode 222 is formed on one side of the third substrate 200'. It should be noted that the third metal electrode 222 is formed, meanwhile, the feeder line 241 is formed, that is, the third metal electrode 222 and the feeder line 241 are located in a same metal layer, and the third metal electrode 222 and the feeder line 241 are formed simultaneously through a same process. The first hollow-out area 212 includes the first division 212a and the second division 212b, the vertical projections of the first division 212a and the second division 212b on the second substrate 200 is overlapped with the vertical projection of the feeder line 241 on the second substrate 200. At the position of the first division 212a, the feeder line 241 couples the high frequency signal to the microstrip line unit 113. At the position of the second division 212b, the microstrip line unit 113 couples the signal to the third metal electrode 222. Finally, the signal is radiated outward from the third metal electrode 222.

In step S24, the first substrate 100 formed with the first metal electrode 111, the line connected to the driving circuit and the first light transmission area T1, and the second substrate 200 formed with the second metal electrode 211 and the second light transmission area T2 are aligned into a cell to form the liquid crystal cell, so that the first frame sealing structure 400 and the liquid crystal layer are arranged between the first substrate 100 and the second substrate 200, the first frame sealing structure 400 is arranged around the liquid crystal layer, and the vertical projection of the first light transmission area T1 is overlapped with the vertical projection of the second light transmission area T2.

In step S25, the second substrate 200 is cut, so that the first substrate 100 exposes the line connected to the driving circuit.

In step S26, the third substrate 200' formed with the third metal electrode 222 is aligned to get fitted with the liquid crystal cell formed in step S24, so that an area of the third substrate 200' overlapped with the vertical projection of the first light transmission area T1 on the third substrate 200' and an area of the third substrate 200' overlapped with the vertical projection of the second light transmission area T2 on the third substrate 200' are light transmissive.

Similarly, in the manufacturing method for the liquid crystal antenna, the large piece of substrate can also be used for manufacturing. When the large piece of substrate is used for manufacturing the liquid crystal antenna, the liquid crystal cell formed in step S24 needs to be cut to form a single liquid crystal cell before step S25.

It needs to be further explained that in the method of manufacturing the liquid crystal antenna through the large piece of substrate, an order of steps S24 to S26 needs to be adjusted. In an embodiment, step S26 needs to be performed before step S24, the liquid crystal celles formed by three large pieces of substrates are first cut to form a single liquid crystal antenna, and then the second substrate 200 and the third substrate 200' are cut to expose the line connected to the driving circuit on the first substrate 100.

In the two types of manufacturing methods provided above, the methods further include binding the driving circuit 130 to the liquid crystal antenna cell. The driving circuit 130 is used for providing signals to the liquid crystal antenna. When the first substrate 100 and the second substrate 200 are aligned into a cell, a first frame sealing structure 400 needs to be formed. At the same time, the second frame sealing structure 401 is formed in a same process. The second frame sealing structure 401 surrounds the sandwiched area formed between the first light transmission area T1 and the second light transmission area T2.

In an embodiment, further provided is another manufacturing method for the liquid crystal antenna. Please refer to FIGS. 38 to 42, the manufacturing method includes the following steps.

In step S31, the first substrate 100 and the second substrate 200 are provided, and the first metal electrode 111 and the line connected to the driving circuit are formed on the first substrate 100. The first metal electrode 111 includes a plurality of microstrip line units 113, the line connected to the driving circuit includes the binding pad 112 and the wire 114 for connecting the binding pad 112 with the microstrip line unit 113.

In step S32, the second metal electrode 211 is formed on one side of the second substrate 200, and the second metal electrode 211 includes a plurality of first hollow-out areas 212 and at least one third hollow-out area 215. It should be noted that the first hollow-out area 212 and the third hollow-out area 215 are formed, meanwhile, the second hollow-out area 214 is formed; the second hollow-out area 214 is correspondingly provided with the signal introduction rod 240, and the third hollow-out area 215 corresponds to the second light transmission area T2.

In step S33, the third metal electrode 222 is formed on another side of the second substrate 200, the vertical projection of the first hollow-out area 212 on the second substrate 200 is located within the vertical projection of the third metal electrode 222 on the second substrate 200, and the vertical projection of the third metal electrode 222 on the second substrate 200 is not overlapped with the vertical projection of the third hollow-out area 215 on the second substrate 200. It should be noted that the third metal electrode 222 is formed, meanwhile, the feeder line 241 is formed, that is, the third metal electrode 222 and the feeder line 241 are located in a same metal layer, and the third metal electrode 222 and the feeder line 241 are formed simultaneously through the same process. The first hollow-out area 212 includes the first division 212a, the vertical projection of the first division 212a is overlapped with the vertical projections of the feeder line 241 and the second division 212b on the second substrate 200. At the position of the first division 212a, the feeder line 241 couples the high frequency signal to the microstrip line unit 113. At the position of the second division 212b, the microstrip line unit 113 couples the signal to the third metal electrode 222. Finally, the signal is radiated outward from the third metal electrode 222.

In step S34, the first substrate 100 formed with the first metal electrode 111 and the line connected to the driving circuit, and the second substrate 200 formed with the second metal electrode 211 and the third metal electrode 222 are aligned into a cell to form the liquid crystal cell, so that the first frame sealing structure 400 and the liquid crystal layer are arranged between the first substrate 100 and the second substrate 200, the first frame sealing structure 400 is arranged around the liquid crystal layer, and the vertical projection of the third hollow-out area 215 on the first substrate 100 is not overlapped with the vertical projection of the first metal electrode 111 on the first substrate 100.

In step S35, the second substrate 200 is cut, so that the first substrate 100 exposes the line connected to the driving circuit.

Similarly, in the present embodiment, in order to improve production efficiency, a large piece of substrate can also be used for manufacturing, and a manufacturing method thereof is similar to the method of using the large piece of substrate in the above two embodiments, and will not be repeated here. In an embodiment, after step S35, a step of binding the driving circuit 130 is further included. And in another embodiment, a step of binding the flexible circuit board 140 is further included. The flexible circuit board 140 and the driving circuit are electrically connected through the binding pad 112 on the first substrate.

In the present embodiment, after step S35, in addition to binding the driving circuit 130 and the flexible circuit board 140, a step of perforating the liquid crystal cell and a step of perforating at the sandwiched area 213 formed between the first light transmission area T1 and the second light transmission area T1 are further included. It should be noted that before aligning the first substrate 100 and the second substrate 200 into a cell, the barrier needs to be formed so as to prevent liquid crystal leakage after perforating the liquid crystal cell.

In an embodiment, the barrier can be formed simultaneously with the first frame sealing structure 400. However, the embodiment of the present application is not limited to this. In an embodiment, the polymer monomer may be added to the liquid crystal layer. After the liquid crystal cell is formed, the ultraviolet light is used to irradiate from one side of the second substrate 200, and the polymer monomers within an area irradiated by the ultraviolet light polymerize to form the barrier 500. Finally, a perforating process is used to form the structure illustrated in FIG. 22. In the step in which the polymer monomer within the area irradiated by the ultraviolet light polymerize to form the barrier 500, the mask plate may be used to form the barrier 500 within a particular light transmission area. However, because in the liquid crystal antenna, each metal electrode is opaque, a functional area of the liquid crystal antenna is shield by the metal, the light cannot pass through and thus cannot cause the polymer monomer to form the barrier within the functional area of the liquid crystal antenna. Therefore, the mask plate may also not be used, which avoids increasing the production cost.

Figure 42:
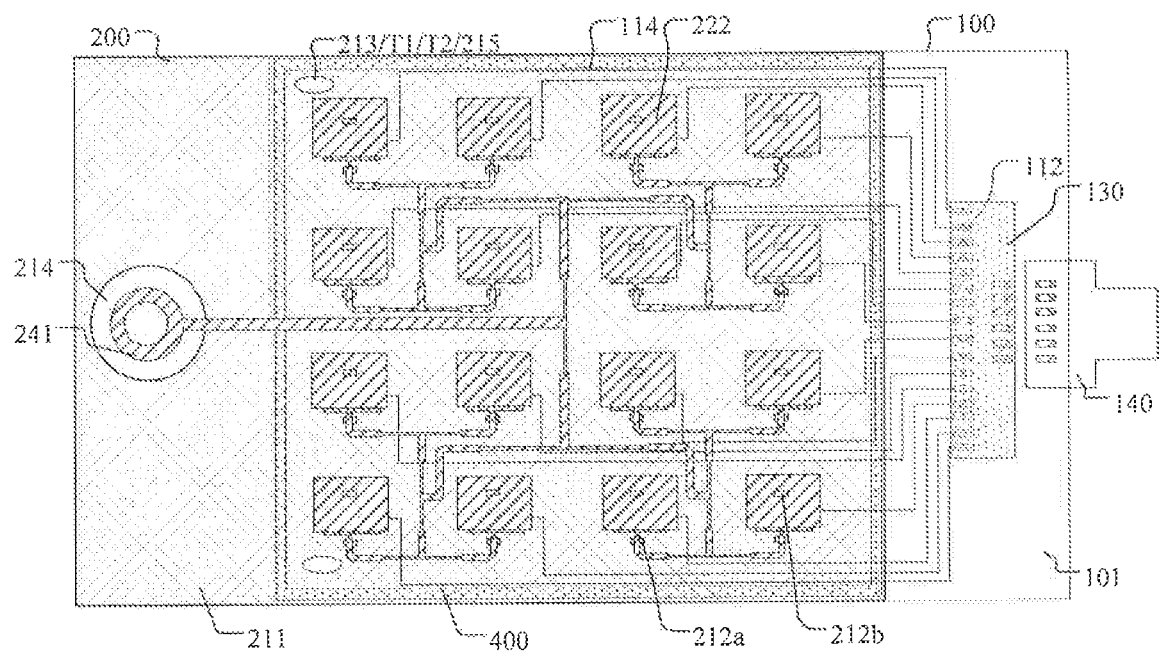

In another embodiment, in order to facilitate perforating, a perforating mark may be set in advance on one side of the first substrate 100 facing away from the second substrate 200, or on one side of the second substrate 200 facing away from the first substrate 100. As shown in FIG. 42, the perforating mark may be an oval structure or a circular structure.

In the manufacturing methods for each of the liquid crystal antennas described above, a step in which the first substrate 100 is cut to expose the second hollow-out area 214 of the second substrate is further included, thereby facilitating perforating the second substrate 200 to connect the signal introduction rod 240 to the liquid crystal antenna. The signal introduction rod 240 is electrically connected to the feeder line 241, thereby introducing the high frequency signal into the liquid crystal antenna. The high frequency signal is coupled to the microstrip line unit 113 on the first substrate 100 through the feeder line 241 at the first division 212a of the first hollow-out area 212. The microstrip line unit 113 is coupled to the third metal electrode 222 through the liquid crystal layer at the second division 212b of the first hollow-out area 212, and the third metal electrode 222 radiates the signal outward.

It should be noted that in the liquid crystal antenna and the manufacturing method for the liquid crystal antenna provided by the embodiment of the present application, within an area where the cell thickness is tested, the first metal electrode 111, the second metal electrode 211 and the third metal electrode 222 each are designed to be hollow-out areaed-out. That is, the first metal electrode 111, the second metal electrode 211 and the third metal electrode 222 each are formed by a film forming and patterning process, then each metal film layer within the area where the cell thickness is tested is etched out in the patterning process.

It should be further noted that in the liquid crystal antenna provided by the embodiment of the present application, merely the driving circuit 130 or the flexible circuit board 140 may be included, or both the driving circuit 130 and the flexible circuit board 140 may be included. A specific design needs to be determined according to an actual situation. The driving circuit 130 may be the driving chip (integrated circuit, IC). The driving chip may be connected to each part of the liquid crystal antenna by directly binding on the substrate, or by pre-binding to an intermediate substrate, and then through binding connection between the intermediate substrate and the substrate to realize chain connection to each part of the liquid crystal antenna. In an embodiment, the intermediate substrate may be a flexible substrate.

Because the liquid crystal antenna and manufacturing method thereof and the communication device provided by the embodiment of the present application are provided with a light transmission area used to test the cell thickness, the cell thickness can be measured at initial formation of the cell, and according to the pressure of the pressure head matched with measured data, more liquid crystal antennas can meet a required range of cell thickness determined by other parameters, thereby improving a mass production yield of the liquid crystal antennas, which provides a basis for mass application of the liquid crystal antennas.

The above description of the disclosed embodiments enables those skilled in the art to implement or use the present invention. Various modifications to these embodiments will be apparent to those skilled in the art, and the general principles defined herein may be implemented in other embodiments without departing from the spirit or scope of the present invention. Therefore, the present invention is not intended to be limited to the embodiments shown herein but is to be accorded the widest scope consistent with the principles and novel features disclosed herein.

What is claimed is:

1. A liquid crystal antenna, comprising:
   a first substrate;
   a second substrate arranged opposite to the first substrate;
   a liquid crystal layer located between the first substrate and the second substrate;
   a first metal electrode located on one side of the first substrate facing toward the second substrate, wherein the first metal electrode comprises a plurality of microstrip line units;
   a driving circuit located within a step area of the first substrate beyond the second substrate, wherein the first metal electrode is electrically connected to the driving circuit;
   a second metal electrode located on one side of the second substrate facing toward the first substrate, wherein the second metal electrode comprises a plurality of first hollow-out areas, and a vertical projection of one of the plurality of first hollow-out areas on the second substrate is located within a vertical projection of the first metal electrode on the second substrate;
   a third metal electrode located on one side of the second substrate facing away from the first substrate, wherein the vertical projection of the one of the plurality of first hollow-out areas on the second substrate is located within a vertical projection of the third metal electrode on the second substrate; and
   a first frame sealing structure located between the first substrate and the second substrate and arranged around the liquid crystal layer, wherein the first substrate, and the second substrate and the first frame sealing structure form a liquid crystal cell;
   wherein,
   the first substrate and the second substrate each are a transparent substrate;
   the first substrate comprises a first extension area beyond the first frame sealing structure, the first extension area comprises a first light transmission area, and a first transparent film layer or no structure is arranged within the first light transmission area;
   the second substrate comprises a second extension area beyond the first frame sealing structure, the second extension area comprises a second light transmission area, and a second transparent film layer or no structure is arranged within the second light transmission area; and
   the first light transmission area is overlapped with the second light transmission area.

2. The liquid crystal antenna according to claim 1, further comprising a second frame sealing structure, wherein the second frame sealing structure is located on one side of the first frame sealing structure, and the first substrate, the second substrate, the first sealing structure and the second frame sealing structure form an extension cell.

3. The liquid crystal antenna according to claim 2, wherein the first frame sealing structure and the second frame sealing structure each are frame sealant.

4. The liquid crystal antenna according to claim 2, wherein the first frame sealing structure is frame sealant, and the second frame sealing structure is a supporting retaining wall.

5. The liquid crystal antenna according to claim 1, wherein the first light transmission area and the step area are located on a same side of the liquid crystal cell.

6. The liquid crystal antenna according to claim 1, further comprising a signal introduction area of the second substrate beyond the first substrate, wherein the second metal electrode further comprises a second hollow-out area, and the signal introduction area is located within the second hollow-out area; and a through hole running through the second substrate is arranged in the signal introduction area.

7. The liquid crystal antenna according to claim 6, wherein the signal introduction area and the step area are separately located on both sides of the liquid crystal cell and are oppositely arranged.

8. The liquid crystal antenna according to claim 6, wherein the second light transmission area and the signal introduction area are located on a same side of the liquid crystal cell.

9. The liquid crystal antenna according to claim 1, wherein the driving circuit is a flexible circuit board.

10. The liquid crystal antenna according to claim 1, further comprising a third substrate, wherein the third substrate is located on one side of the second substrate facing away from the first substrate, the third metal electrode is located on one side of the third substrate facing away from the second substrate, and an area of the third substrate overlapped with the first light transmission area and second light transmission area is light transmissive.

11. A liquid crystal antenna, comprising:
a first substrate;
a second substrate arranged opposite to the first substrate;
a liquid crystal layer located between the first substrate and the second substrate;
a first frame sealing structure located between the first substrate and the second substrate and arranged around the liquid crystal layer, wherein the first substrate, the second substrate and the first frame sealing structure form a liquid crystal cell;
a first metal electrode located on one side of the first substrate facing toward the second substrate, wherein the first metal electrode comprises a plurality of microstrip line units;
a driving circuit located within a step area of the first substrate beyond the second substrate, wherein the first metal electrode is electrically connected to the driving circuit;
a second metal electrode located on one side of the second substrate facing toward the first substrate, wherein the second metal electrode comprises a plurality of first hollow-out areas and at least one third hollow-out area, and a vertical projection of one of the plurality of first hollow-out areas on the second substrate is located within a vertical projection of the first metal electrode on the second substrate; and
a third metal electrode located on one side of the second substrate facing away from the first substrate, wherein the vertical projection of the one of the plurality of first hollow-out areas on the second substrate is located within a vertical projection of the third metal electrode on the second substrate;
wherein,
the at least one third hollow-out area is not overlapped with neither the first metal electrode nor the third metal electrode; and
the vertical projection of the one of the plurality of first hollow-out areas and a vertical projection of the at least one third hollow-out area on the second substrate are located within a vertical projection of the liquid crystal cell on the second substrate.

12. The liquid crystal antenna according to claim 11, further comprising an annular barrier located in the liquid crystal layer, wherein an area surrounded by the annular barrier is overlapped with the at least one third hollow-out area.

13. The liquid crystal antenna according to claim 12, wherein the annular barrier and the first frame sealing structure are made of the same material.

14. The liquid crystal antenna according to claim 12, wherein the liquid crystal layer is made of polymer liquid crystal, and the annular barrier is made of polymers in the polymer liquid crystal.

15. The liquid crystal antenna according to claim 11, wherein a minimum distance between the at least one third hollow-out area and one of the plurality of microstrip line units is L1, and L1≥200 μm.

16. The liquid crystal antenna according to claim 11, wherein a minimum distance between the at least one third hollow-out area and the one of the plurality of first hollow-out areas is L2, and L2≥200 μm.

17. The liquid crystal antenna according to claim 11, wherein the first substrate comprises a first through hole, the second substrate comprises a second through hole, wherein the first through hole is overlapped with the second through hole, the first through hole is overlapped with the at least one third hollow-out area, and the second through hole is overlapped with the at least one third hollow-out area.

18. The liquid crystal antenna according to claim 11, further comprising a fixed device, wherein a fixed rod penetrates through the first through hole and the second through hole, and is connected to the fixed device.

19. The liquid crystal antenna according to claim 11, further comprising a signal introduction area of the second substrate beyond the first substrate, wherein the signal introduction area comprises a through hole running through the second substrate.

20. A communication device, further comprising a liquid crystal antenna, wherein the liquid crystal antenna comprises:
a first substrate;
a second substrate arranged opposite to the first substrate;
a liquid crystal layer located between the first substrate and the second substrate;
a first frame sealing structure located between the first substrate and the second substrate and arranged around the liquid crystal layer, wherein the first substrate, the second substrate and the first frame sealing structure form a liquid crystal cell;
a first metal electrode located on one side of the first substrate facing toward the second substrate, wherein the first metal electrode comprises a plurality of microstrip line units;
a driving circuit located within a step area of the first substrate beyond the second substrate, wherein the first metal electrode is electrically connected to the driving circuit;
a second metal electrode located on one side of the second substrate facing toward the first substrate, wherein the second metal electrode comprises a plurality of first hollow-out areas and at least one third hollow-out area, and a vertical projection of one of the plurality of first hollow-out areas on the second substrate is located within a vertical projection of the first metal electrode on the second substrate; and
a third metal electrode located on one side of the second substrate facing away from the first substrate, wherein the vertical projection of the one of the plurality of first hollow-out areas on the second substrate is located within a vertical projection of the third metal electrode on the second substrate;
wherein,
the at least one third hollow-out area is not overlapped with neither the first metal electrode nor the third metal electrode; and
the vertical projection of the one of the plurality of first hollow-out areas and a vertical projection of the at least one third hollow-out area on the second substrate are located within a vertical projection of the liquid crystal cell on the second substrate.

* * * * *